US008370040B2

(12) United States Patent
Inoue et al.

(10) Patent No.: US 8,370,040 B2
(45) Date of Patent: Feb. 5, 2013

(54) VEHICLE TRAVEL CONTROL DEVICE

(75) Inventors: Gen Inoue, Susono (JP); Yasuhito Ishida, Toyokawa (JP)

(73) Assignees: Toyota Jidosha Kabushiki Kaisha, Toyota (JP); Advics Co., Ltd., Kariya (JP)

( * ) Notice: Subject to any disclaimer, the term of this patent is extended or adjusted under 35 U.S.C. 154(b) by 186 days.

(21) Appl. No.: 12/450,992

(22) PCT Filed: Sep. 4, 2008

(86) PCT No.: PCT/IB2008/002298
§ 371 (c)(1),
(2), (4) Date: Oct. 21, 2009

(87) PCT Pub. No.: WO2009/031014
PCT Pub. Date: Mar. 12, 2009

(65) Prior Publication Data
US 2010/0121550 A1 May 13, 2010

(30) Foreign Application Priority Data

Sep. 6, 2007 (JP) .................................. 2007-232075

(51) Int. Cl.
*G06F 7/70* (2006.01)
(52) U.S. Cl. ................. 701/70; 701/71; 701/75; 701/78; 701/79; 701/82; 701/83; 701/84; 701/86
(58) Field of Classification Search .................... None
See application file for complete search history.

(56) References Cited

U.S. PATENT DOCUMENTS

| 4,969,103 | A | * | 11/1990 | Maekawa ........................ 701/96 |
| 5,088,043 | A | * | 2/1992 | Akishino et al. ............... 701/93 |
| 5,166,881 | A | * | 11/1992 | Akasu .............................. 701/96 |
| 5,396,426 | A | * | 3/1995 | Hibino et al. ................... 701/96 |
| 5,495,251 | A | * | 2/1996 | Gilling et al. ................... 342/70 |

(Continued)

FOREIGN PATENT DOCUMENTS

| DE | 2 260 939 | 6/1974 |
| DE | 196 27 727 A1 | 1/1998 |

(Continued)

OTHER PUBLICATIONS

Aug. 2, 2011 Office Action issued in Japanese Patent Application No. 2007-232075 (with partial translation).

(Continued)

*Primary Examiner* — Khoi Tran
*Assistant Examiner* — Bhavesh V Amin
(74) *Attorney, Agent, or Firm* — Oliff & Berridge, PLC

(57) ABSTRACT

A vehicle travel control device has a engine that controls an engine based on a driving target controlled variable; a brake that controls a brake device based on a braking target controlled variable; and a automatic travel control that calculates the driving target controlled variable and/or braking target controlled variable so that a vehicle speed of a vehicle becomes a target vehicle speed, and outputs the driving target controlled variable to the engine and the braking target controlled variable to the brake, the vehicle travel control device being configured such that, upon detection of an acceleration operation during the vehicle travel control, the automatic travel control calculates a target vehicle speed for vehicle travel control by the brake device, so that the target vehicle speed becomes higher than a current vehicle speed of the vehicle.

24 Claims, 11 Drawing Sheets

U.S. PATENT DOCUMENTS

| | | | | |
|---|---|---|---|---|
| 5,771,481 A | * | 6/1998 | Gilling | 701/93 |
| 5,781,103 A | * | 7/1998 | Gilling | 340/441 |
| 6,044,321 A | * | 3/2000 | Nakamura et al. | 701/96 |
| 6,311,117 B1 | | 10/2001 | Winner et al. | |
| 6,330,506 B1 | | 12/2001 | Roulet | |
| 6,370,470 B1 | * | 4/2002 | Yamamura et al. | 701/96 |
| 6,597,981 B2 | * | 7/2003 | Nishira et al. | 701/96 |
| 6,708,099 B2 | * | 3/2004 | Tellis et al. | 701/96 |
| 2001/0012976 A1 | * | 8/2001 | Menig et al. | 701/1 |
| 2004/0061626 A1 | * | 4/2004 | Kubota | 340/901 |
| 2008/0189021 A1 | * | 8/2008 | Inoue et al. | 701/93 |
| 2009/0025996 A1 | * | 1/2009 | Inoue et al. | 180/179 |
| 2009/0069996 A1 | * | 3/2009 | Ishida et al. | 701/93 |

FOREIGN PATENT DOCUMENTS

| | | |
|---|---|---|
| DE | 198 59 744 A1 | 6/2000 |
| DE | 199 01 527 C1 | 7/2000 |
| DE | 199 25 369 A1 | 12/2000 |
| DE | 199 61 720 A1 | 8/2001 |
| DE | 101 01 012 A1 | 7/2002 |
| DE | 101 42 274 A1 | 3/2003 |
| DE | 10 2005 021 713 A1 | 11/2006 |
| EP | 1 288 056 A2 | 3/2003 |
| GB | 2 350 699 A | 12/2000 |
| JP | A-08-040110 | 2/1996 |
| JP | A-2004-90679 | 3/2004 |
| WO | WO 2006/131421 A1 | 12/2006 |

OTHER PUBLICATIONS

German Office Action issued in German Application No. 11 2008 002 424.3 dated Apr. 25, 2012 (w/ English Translation).

* cited by examiner

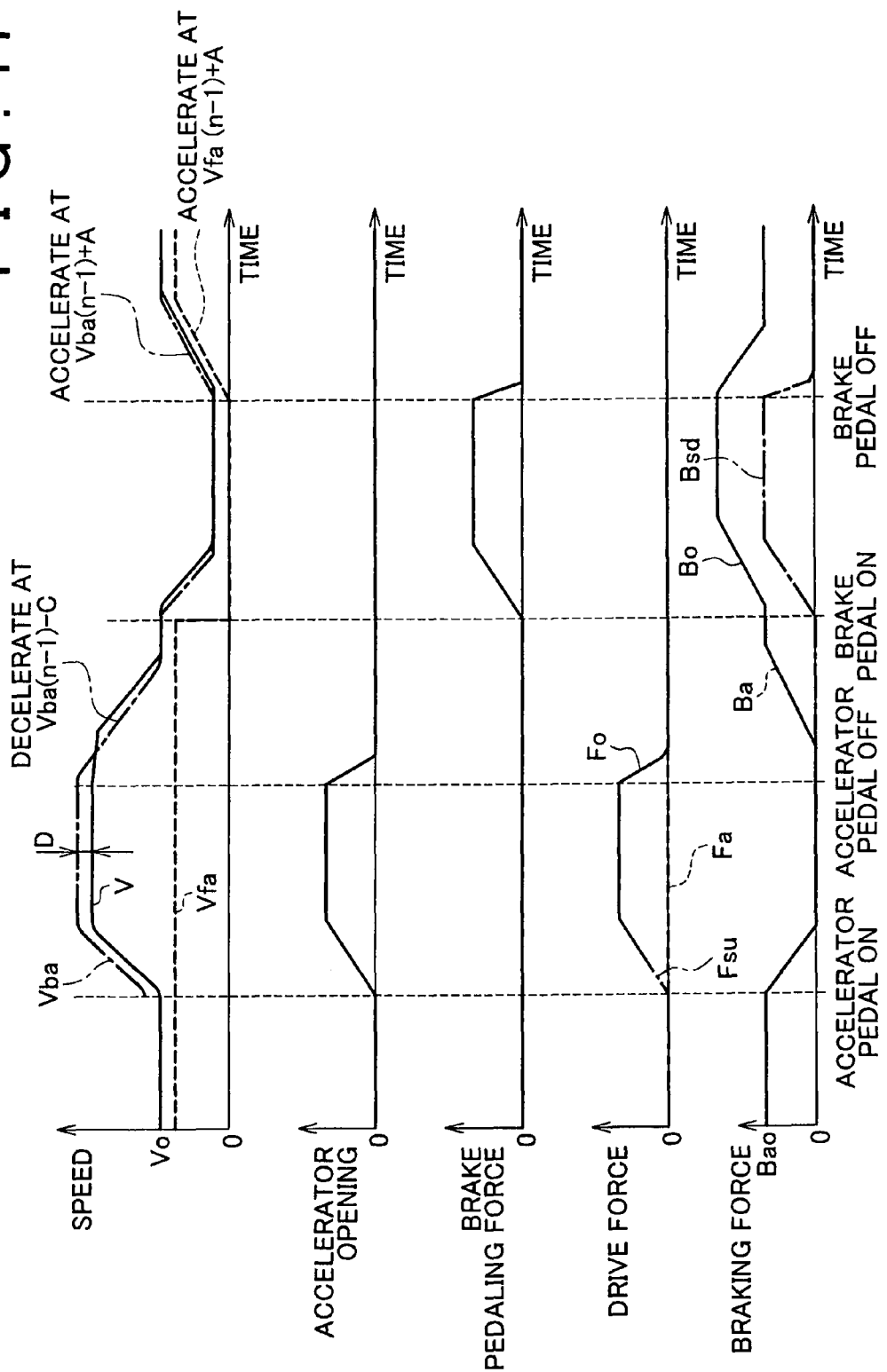

VEHICLE TRAVEL CONTROL DEVICE

BACKGROUND OF THE INVENTION

1. Field of the Invention

This invention relates to a vehicle travel control device, and more particularly to a vehicle travel control device which enables a driver to accelerate or decelerate a vehicle as intended when the driver carries out an acceleration operation or a deceleration operation during automatic travel control.

2. Description of the Related Art

For the purpose of making driver's vehicle driving operations easy, a vehicle is installed with a vehicle travel control device for performing automatic travel control, such as constant speed travel control for bringing a vehicle speed to a target vehicle speed and follow-up travel control for causing the vehicle to travel while following a preceding vehicle, namely, adoptive cruise control (ACC). In this vehicle travel control device, an electric control unit (ECU) for automatic travel control calculates a target drive force as a target controlled variable so as to bring the vehicle speed to a target vehicle speed. Moreover, in this vehicle travel control device, the calculate target drive force is output to an engine ECU, and then the engine ECU controls an engine, which serves as a vehicle speed regulating device for regulating the vehicle speed, on the basis of this output target drive force. In such a vehicle travel control device, the automatic travel control is stopped when the driver performs a braking operation.

In recent years, there has been demanded for automatic travel control to be performed at low vehicle speed, e.g., at 10 km/h. In such a vehicle travel control device, when a driver performs a braking operation while the driver's vehicle automatically travels on a slope at low vehicle speed under automatic travel control, the automatic travel control stops. In this case, if the driver cannot stop the vehicle on the slope by means of braking force generated from the driver's braking operation, the position of the vehicle cannot be maintained and thus the vehicle might slide down especially on an ascending slope and behave differently.

Therefore, a technology for preventing the automatic travel control from stopping during the braking operation performed by the drive is proposed in the vehicle travel control device described above. Japanese Patent Application Publication No. 2004-90679 (JP-A-2004-90679), for example, proposes a technology in which automatic travel control is not stopped during braking control performed by a driver, an automatic travel control ECU reduces a target vehicle speed and calculates a target drive force to realize the reduced target vehicle speed, and an engine ECU controls an engine based on the target drive force calculated by the automatic travel control ECU to thereby reduce vehicle speed. Also, in JP-A-2004-90679, the greater the accelerator opening is, the higher the target vehicle speed is corrected, and the greater the brake operation amount is, the lower the target vehicle speed is corrected.

Incidentally, the acceleration/deceleration vehicle speed that is generated by the target vehicle speed corrected as described above is different from the acceleration/deceleration vehicle speed that is generated when an acceleration operation or a brake operation is performed while the automatic travel control is stopped, which brings discomfort to the driver. In other words, inappropriately corrected target vehicle speed cannot provide the driver with acceleration feeling or deceleration feeling that the driver desires. For example, when the target vehicle speed is corrected to a high-speed side more than necessary, the driver feels an acceleration level that is higher than what the driver desires. Also, when the target vehicle speed is corrected to a low-speed side more than necessary, the driver feels a deceleration level that is lower than what the driver desires. Furthermore, when the driver performs the acceleration operation or brake operation roughly, the target vehicle speed is corrected instantly, providing more discomfort to the driver. For example, sudden release of the brake pedal instantly corrects the target vehicle speed to the high-speed side, which accelerates the vehicle suddenly. On the other hand, sudden release of the accelerator pedal instantly corrects the target vehicle speed to the low-speed side, which might decelerate the vehicle suddenly.

An object of the invention, therefore, is to provide a vehicle travel control device which enables a driver to accelerate or decelerate a vehicle as intended without bringing discomfort to the driver, when the driver carries out an acceleration operation or a deceleration operation during automatic travel control.

SUMMARY OF THE INVENTION

A first aspect of the invention relates to a vehicle travel control device, which has: a first ECU that controls an engine based on a driving target controlled variable; a second ECU that controls a brake device based on a braking target controlled variable; and a third ECU that calculates the driving target controlled variable and/or braking target controlled variable when performing vehicle travel control so that a vehicle speed of a vehicle becomes a target vehicle speed, and outputs the driving target controlled variable to the first ECU and the braking target controlled variable to the second ECU. Upon detection of an acceleration operation performed by a driver during the vehicle travel control, the third ECU corrects the target vehicle speed for vehicle travel control by the brake device, to a speed higher than a current vehicle speed of the vehicle.

A second aspect of the invention relates to a vehicle travel control device, which has: a first ECU that controls an engine based on a driving target controlled variable; a second ECU that controls a brake device based on a braking target controlled variable; and a third ECU that calculates the driving target controlled variable and/or braking target controlled variable when performing vehicle travel control so that a vehicle speed of a vehicle becomes a target vehicle speed, and outputs the driving target controlled variable to the first ECU and the braking target controlled variable to the second ECU. Upon detection of a deceleration operation performed by a driver during the vehicle travel control, the third ECU matches the target vehicle speed for the vehicle travel control by the brake device, with a current vehicle speed of the vehicle.

In the vehicle travel control device according to the invention, when the acceleration operation performed by the driver is detected during the vehicle travel control; the third ECU corrects the target vehicle speed for vehicle travel control by the breaking force of the brake device to a speed higher than a current vehicle speed of the vehicle. Also, in the vehicle travel control device according to the invention, when the deceleration operation performed by the driver is detected during the vehicle travel control, the third ECU matches the target vehicle speed for vehicle travel control by the breaking force of the brake device with a current vehicle speed of the vehicle. Specifically, in this vehicle travel control device, the braking force is controlled in accordance with the acceleration operation and the deceleration operation performed by the driver during the vehicle travel control so as to achieve the target vehicle speed. This target vehicle speed is set for controlling the breaking force by the brake device. Therefore, when the driver carries out the acceleration operation during automatic travel control, the vehicle travel control device can accelerates the vehicle as intended by the driver without applying excess braking force to the vehicle or bringing discomfort to the driver. Moreover, when the driver carries out the deceleration operation during the automatic travel control, the vehicle travel control device can decelerate the vehicle as intended by the driver by applying sufficient braking force to the vehicle without bringing discomfort to the driver.

BRIEF DESCRIPTION OF THE DRAWINGS

The foregoing and further objects, features and advantages of the invention will become apparent from the following description of embodiments with reference to the accompanying drawings, wherein like numerals are used to represent like elements and wherein:

FIG. 11 is a time chart for explaining an operation performed by the vehicle travel control device of Embodiment 2 during travel on a descending slope.

DETAILED DESCRIPTION OF THE EMBODIMENTS

Hereinafter, embodiments of the vehicle travel control device according to the invention are described in detail with reference to the drawings. Note that the invention is not limited by these embodiments.

Embodiment 1 of the vehicle travel control device according to the invention is described with reference to FIGS. 1 to 9.

Figure 1:
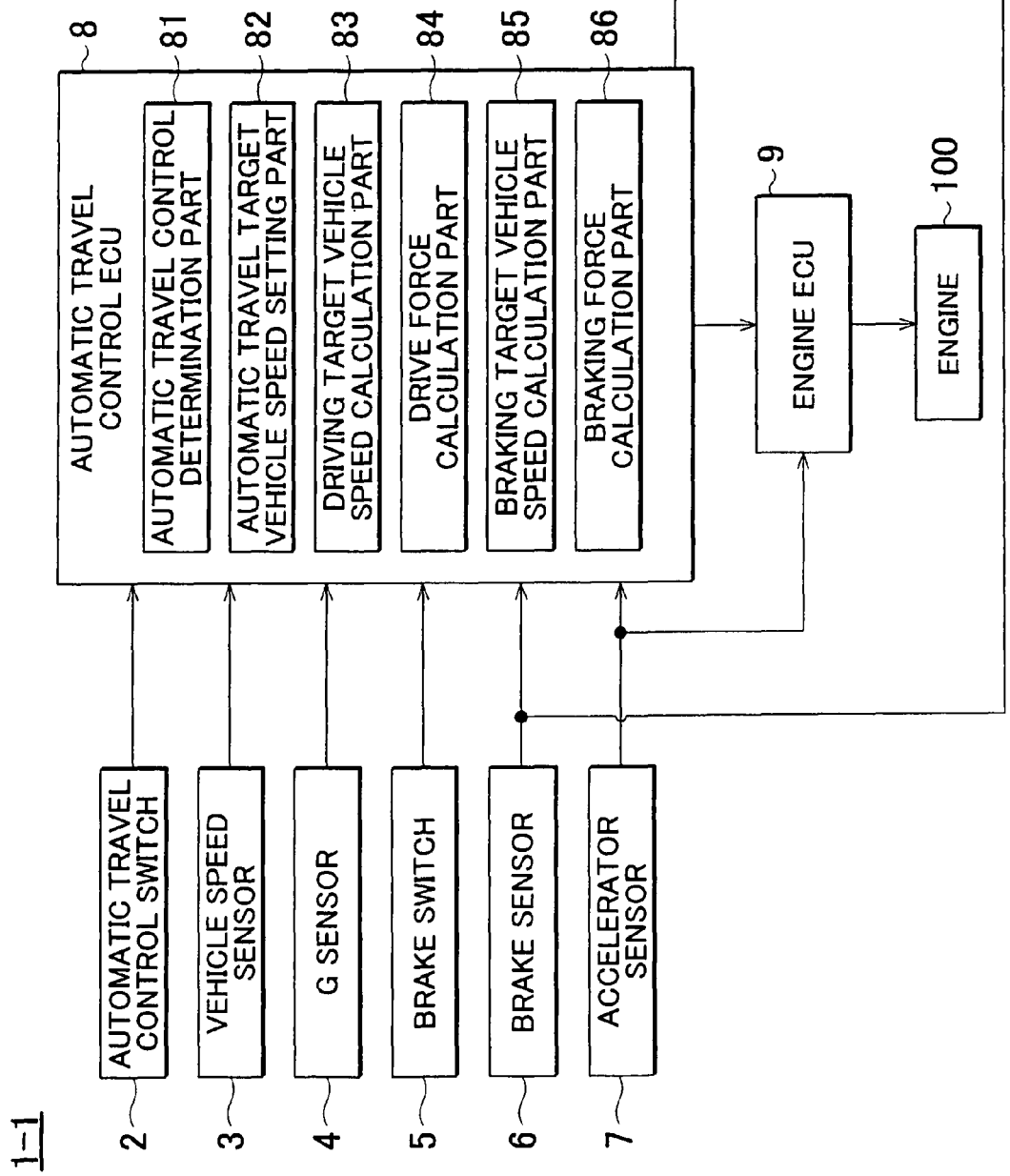
FIG. 1 is a diagram showing an example of the configuration of a vehicle travel control device according to the invention.

First of all, the configuration of the vehicle travel control device of Embodiment 1 is described using FIG. 1. Reference numeral 1-1 shown in FIG. 1 represents the vehicle travel control device of Embodiment 1. This vehicle travel control device 1-1 is installed in a vehicle (not shown) and serves to perform automatic travel control so that the vehicle speed of the vehicle becomes a target vehicle speed. The vehicle travel control device 1-1 of Embodiment 1 has an automatic travel control switch 2, a vehicle speed sensor 3, a G sensor 4, a brake switch 5, a brake sensor 6, an accelerator sensor 7, an automatic travel control ECU 8, an engine ECU 9, and a brake ECU 10.

The vehicle of Embodiment 1 is provided with a vehicle speed regulating device for regulating the vehicle speed. Also, this vehicle is provided with, as the vehicle speed regulating devices, an engine 100, shown in FIG. 1, for regulating the vehicle speed by increasing and reducing a drive force applied to the vehicle, and a brake device 200, shown in FIG. 1, for regulating the vehicle speed by increasing and reducing a braking force applied to the vehicle. The engine 100 is activated based on a target drive force which is a target controlled variable set by the engine ECU 9. The engine 100 generates the drive force based on an acceleration operation performed by a driver, namely, a pedaling operation of an accelerator pedal (not shown) manipulated by the driver. The brake device 200, on the other hand, is activated based on a target braking force which is target braking amount set by the brake ECU 10. The brake device 200 also generates a braking force based on a deceleration operation performed by the driver, namely, a pedaling operation of a brake pedal (not shown) manipulated by the driver.

Hereinafter, the automatic travel control switch 2, vehicle speed sensor 3, G sensor 4, brake switch 5, brake sensor 6, accelerator sensor 7, automatic travel control ECU 8, engine ECU 9, and brake ECU 10 are described in detail.

First of all, the automatic travel control switch 2 is a control trigger. Specifically, the automatic travel control switch 2 is provided inside the vehicle (not shown) and switched on by the operation performed by the driver. The automatic travel control switch 2 is connected to the automatic travel control ECU 8 and, once the automatic travel control switch 2 is switched on, outputs an ON signal to the automatic travel control ECU 8 once switched on by the operation performed by the driver. Therefore, the automatic travel control switch 2 is a control trigger for the automatic travel control ECU 8 to start performing automatic travel control.

The vehicle speed sensor 3 detects a vehicle speed V of the vehicle (not shown). The vehicle speed sensor 3 is connected to the automatic travel control ECU 8 and hence outputs the detected vehicle speed V of the vehicle to the automatic travel control ECU 8. Here, the vehicle speed sensor 3 is, for example, a wheel speed sensor provided in each of the wheels of the vehicle (not shown). In this case, the automatic travel control ECU 8 calculates the vehicle speed V of the vehicle on the basis of the speed of each wheel that is detected by the corresponding wheel speed sensor functioning as the vehicle speed sensor 3.

The G sensor 4 functions as gradient detection means for detecting the gradient of a traveling road surface. The G sensor 4 detects the inclination of the vehicle (not shown). Specifically, the G sensor 4 detects the gradient θ of a road surface on which the vehicle currently travels. Here, the G sensor 4 is connected to the automatic travel control ECU 8 and hence outputs the detected gradient θ to the automatic travel control ECU 8.

The brake switch 5 functions as braking operation detection means. The brake switch 5 detects a braking operation (deceleration operation) performed by the driver. The brake switch 5 is switched on by pedaling the brake pedal provided inside the vehicle (not shown). Here, the brake switch 5 is connected to the automatic travel control ECU 8 and, once the brake switch 5 is switched on by the pedaling operation of the brake pedal manipulated by the driver, outputs an ON signal to the automatic travel control ECU 8. As a result, the automatic travel control ECU 8 can determine whether or not the braking operation is performed by the driver.

The brake sensor 6 functions as deceleration operation amount detection means. The brake sensor 6 detects the operation amount of deceleration Ssd performed by the driver. The brake sensor 6 detects the pedaling amount obtained when the driver pedals the brake pedal provided inside the vehicle (not shown), as the deceleration operation amount Ssd. Here, the brake sensor 6 is connected to the automatic travel control ECU 8 and outputs the deceleration operation amount Ssd obtained from the driver to the automatic travel control ECU 8.

The accelerator sensor 7 functions as acceleration operation amount detection means. The accelerator sensor 7 detects the operation amount of acceleration Ssu performed by the driver. The accelerator sensor 7 detects the pedaling amount obtained when the driver pedals the accelerator pedal provided inside the vehicle (not shown), as the acceleration operation amount Ssu. Here, the accelerator sensor 7 is connected to the automatic travel control ECU 8 and outputs the acceleration operation amount Ssu obtained from the driver to the automatic travel control ECU 8.

The automatic travel control ECU 8 functions as the third ECU. The automatic travel control ECU 8 basically calculates a target drive force Fo as a driving target controlled variable, and a target braking force Bo as a braking target controlled variable, during automatic travel control so that the vehicle speed V becomes an automatic travel target vehicle speed Vo which is set previously or by the driver, and outputs the target drive force Fo and the target braking force Bo to the engine ECU 9 and the brake ECU 10 respectively.

Here, the value of the automatic travel target vehicle speed Vo varies depending on what type of automatic travel control the vehicle travel control device 1-1 performs. When the vehicle travel control device 1-1 performs constant speed travel control, the automatic travel target vehicle speed Vo is set at, for example, as low as, for example, 10 km/h or as high as 100 km/h when traveling at high speeds. When the vehicle travel control device 1-1 performs follow-up travel control, the vehicle speed of a preceding vehicle is set at the automatic travel target vehicle speed Vo.

The target drive force Fo means a drive force that is output by the engine ECU 9 to the engine 100. The target braking force Bo means a braking force that is output by the brake ECU 10 to the brake device 200. Specifically, the automatic travel control ECU 8, which controls the engine 100 and the brake device 200 in coordinated fashion, controls the engine 100 to achieve the target drive force Fo via the engine ECU 9 and controls the brake device 200 to achieve the target braking force Bo via the brake ECU 10. The automatic travel control ECU 8 of Embodiment 1 has an automatic travel control determination part 81, an automatic travel target vehicle speed setting part 82, a driving target vehicle speed calculation part 83, a drive force calculation part 84, a braking target vehicle speed calculation part 85, and a braking force calculation part 86. Note that the hardware configuration of the automatic travel control ECU 8 as it is conventional.

Although the automatic travel control ECU 8 has a different configuration from the engine ECU 9 and the brake ECU 10 in this embodiment, these three ECUs may be configured as different hardware or may be integrated into a single control device having the corresponding functions.

The automatic travel control determination part 81 determines the intention of the driver starting the automatic travel control. The automatic travel control determination part 81 checks whether or not the ON signal is detected from the automatic travel control switch 2 to thereby determine whether the automatic travel control needs to be started. For example, when the driver operates the automatic travel control switch 2 and hence the ON signal is output from the automatic travel control switch 2, the automatic travel control determination part 81 determines that start of the automatic travel control is requested.

The automatic travel target vehicle speed setting part 82 calculates and sets the automatic travel target vehicle speed Vo. For example, when the automatic travel control switch 2 is merely switched between ON and OFF, the automatic travel target vehicle speed setting part 82 sets the previously determined automatic travel target vehicle speed Vo upon reception of the ON signal that is output from the automatic travel control switch 2. The automatic travel target vehicle speed Vo in this case may be a variable that is changed in accordance with, for example, the gradient θ of the road surface. Further, when the automatic travel control switch 2 switches between a plurality of automatic travel control conditions or, in other words, switches between a plurality of different target speed levels, the automatic travel target vehicle speed setting part 82 is caused to set the automatic travel target vehicle speed Vo that is selected by the speed level switching operation of the automatic travel control switch 2 manipulated by the driver. For example, when the driver selects the first level using this type of automatic travel control switch 2, the automatic travel control determination part 81 detects the ON signal from the automatic travel control switch 2 and determines that start of the automatic travel control is requested. Then, the automatic travel target vehicle speed setting part 82 sets the automatic travel target vehicle speed Vo to a first target vehicle speed $V_{select1}$ corresponding to the first level. When the second level of the automatic travel control switch 2 is selected, the automatic travel control determination part 81 detects the ON signal from the automatic travel control switch 2 and determines that start of the automatic travel control is requested. Then, the automatic travel target vehicle speed setting part 82 sets the automatic travel target vehicle speed Vo to a second target vehicle speed $V_{select2}(\neq V_{select1})$ corresponding to the second level.

The driving target vehicle speed calculation part 83 calculates a target vehicle speed Vfa for automatic travel control by the engine 100 (referred to as "automatic travel driving target vehicle speed" hereinafter). This target speed Vfa is set for controlling the drive force by the engine 100. The automatic travel driving target vehicle speed Vfa is basically matched with automatic travel target vehicle speed Vo obtained during the automatic travel control (automatic travel on, for example, an ascending slope) carried out mainly using the drive force. On the other hand, the automatic travel driving target vehicle speed Vfa is basically set lower than the automatic travel target vehicle speed Vo during the automatic travel control (automatic travel on, for example, a descending slope) carried out mainly using the braking force.

The drive force calculation part 84 calculates the target drive force Fo that is output to the engine 100. The drive force calculation part 84 outputs the information on the target drive force Fo to the engine ECU 9. The target drive force Fo is matched with a drive force Fao calculated to obtain the automatic travel target vehicle speed Vo (referred to as "automatic travel target drive force" hereinafter) under a circumstance where the automatic travel control is performed using mainly the drive force as described above. On the other hand, the target drive force Fo is basically set at 0 under a circumstance where the automatic travel control is performed using mainly the braking force as described above.

The braking target vehicle speed calculation part 85 calculates a target speed for automatic travel control by the brake device 200 (referred to as "automatic travel braking target vehicle speed" hereinafter) Vba. This target speed Vba is set for controlling the braking force by the brake device 200. The automatic travel braking target vehicle speed Vba is basically set higher than the automatic travel target vehicle speed Vo under a circumstance where the automatic travel control is performed using mainly the drive force. On the other hand, the automatic travel braking target vehicle speed Vba is basically matched with the automatic travel target vehicle speed Vo under a circumstance where the automatic travel control is performed using mainly the braking force.

The braking force calculation part 86 calculates the target braking force Bo that is output by the brake device 200: The braking force calculation part 86 outputs the information on the target braking force Bo to the brake ECU 10. The target braking force Bo is basically set at 0 under a circumstance where the automatic travel control is carried out using mainly the drive force. On the other hand, the target braking force Bo is basically matched with a braking force Bao calculated to obtained the automatic travel target vehicle speed Vo (referred to as "automatic travel target braking force" hereinafter) under a circumstance where the automatic travel control is carried out using mainly the braking force.

As described above, the automatic travel driving target vehicle speed Via, target drive force Fo, automatic travel braking target vehicle speed Vba, and target braking force Bo indicate different values depending on whether the vehicle automatically travels on an ascending slope or a descending slope. Moreover, when the driver makes an acceleration request or deceleration request during the automatic travel control, the automatic travel driving target vehicle speed Vfa, target drive force Fo, automatic travel braking target vehicle speed Vba and target braking force Bo further indicate different values. In the following description, the automatic travel driving target vehicle speed Vfa, target drive force Fo, automatic travel braking target vehicle speed Vba, and target braking force Bo are described in detail for the case where the vehicle automatically travels on an ascending slope at low speed and the case where the vehicle automatically travels on a descending slope at low speed.

{Automatically traveling on an ascending slope at low speed} First of all, the case where the vehicle automatically travels along an ascending slope at low speed is described.

[Automatic travel driving target vehicle speed Vfa] First, the automatic travel driving target vehicle speed Vfa obtained in this case is described.

The automatic travel driving target vehicle speed Vfa in this case varies significantly depending on the presence or absence of a deceleration request generated by the driver during the automatic travel control, i.e., depending on whether or not an ON signal is received from the brake switch 5 or the deceleration operation amount Ssd is received from the brake sensor 6 during the automatic travel control. The automatic travel driving target vehicle speed Vfa is obtained by the following Equation 1 (n=1, 2, 3, . . . ) when no deceleration request is made by the driver, and by the following Equation 2 (n=1, 2, 3, . . . ) when the deceleration request is made by the driver. Specifically, when the driver does not make the deceleration request while automatically traveling on an ascending slope at low speed, minimum values corresponding to "Vfa(n−a)+A" and "Vo" are obtained. On the other hand, when the driver makes the deceleration request while automatically traveling on the ascending slope, minimum values corresponding to "V−B," and "Vfa(n−1)+A" and "Vo" are obtained.

Equation 1

$$Vfa(n) \leftarrow \text{MIN}(Vfa(n-1)+A, Vo) \quad (1)$$

Equation 2

$$Vfa(n) \leftarrow \text{MIN}(V-B, Vfa(n-1)+A, Vo) \quad (2)$$

Figure 2:
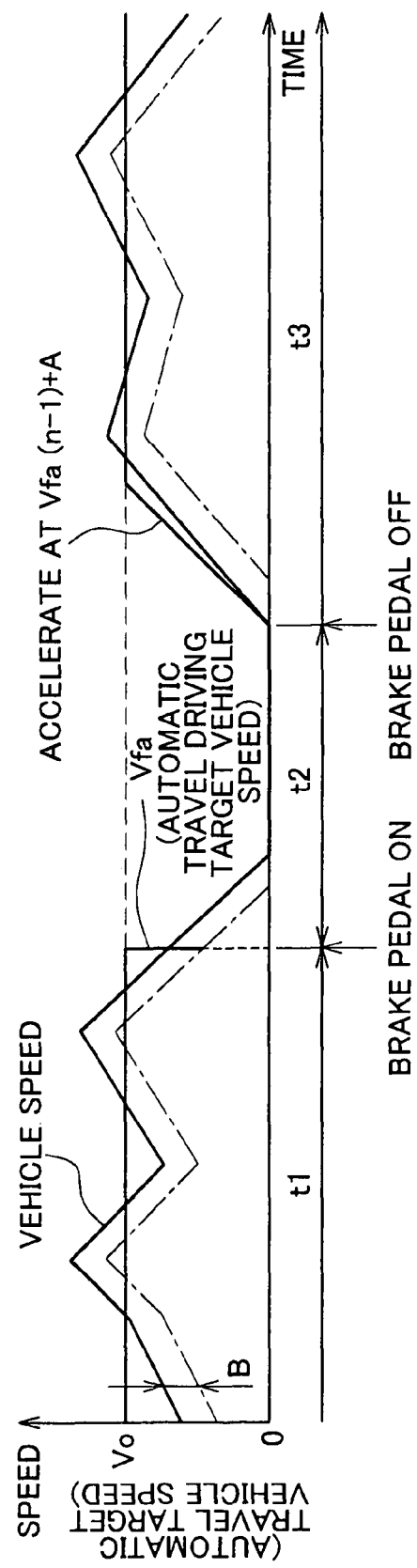
FIG. 2 is a time chart for explaining an automatic travel driving target vehicle speed.
Figure 4:
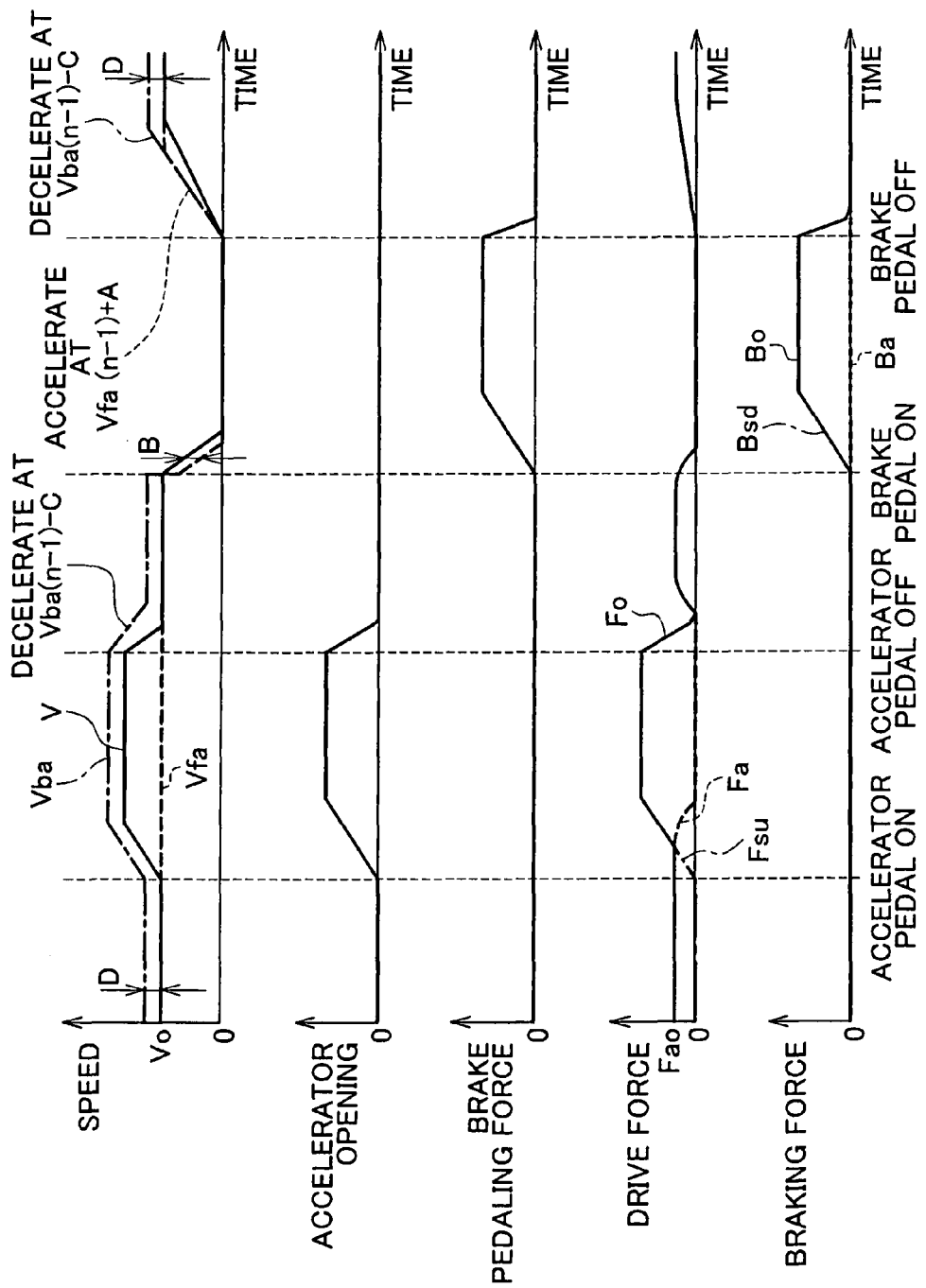
FIG. 4 is a time chart for explaining an operation performed by the vehicle travel control device of Embodiment 1 during travel on an ascending slope.

More specifically, under the condition where the driver does not make the deceleration request while automatically traveling on the ascending slope at low speed, even when the driver makes the acceleration request (iii other words, even when the driver receives the acceleration operation amount Ssu from the accelerator sensor 7), the automatic travel target vehicle speed Vo is basically selected as the automatic travel driving target vehicle speed Vfa as shown by a time domain t1 shown in FIG. 2 and as shown in FIG. 4. However, even under such a condition, when the driver stops the deceleration operation (takes his foot off the brake pedal) in the middle of the deceleration operation (during the ON state of the brake pedal) (that is, immediately after the driver stops the deceleration operation), "Vfa(n−1)+A" is selected as the automatic travel driving target vehicle speed Vfa to accelerate the vehicle toward the automatic travel target vehicle speed Vo, as shown by a time domain t3 shown in FIG. 2 and as shown in FIG. 4.

Here, "Vfa(n−1)" is the previously calculated automatic travel driving target vehicle speed Vfa, and "A" indicates the upper limit of a vehicle accelerated speed. Specifically, "Vfa (n−1)+A" selected as the automatic travel driving target vehicle speed Vfa is the value for gradually and slowly accelerating the vehicle without accelerating the vehicle drastically. Note that "A" may be a fixed value that is set beforehand from an experiment or simulation, or may be a variable that is obtained based on the vehicle speed V during acceleration, the gradient θ of the road surface, the automatic travel target vehicle speed Vo and the like while monitoring them carefully.

On the other hand, under the condition where the driver makes the deceleration request while automatically traveling on the ascending slope at low speed, a value lower than the vehicle speed V, that is, "V−B," is selected as the automatic travel driving target vehicle speed Vfa, as shown by a lime domain t2 shown in FIG. 2 and as shown in FIG. 4. This "B" is a setting speed for reducing the drive force that is output from the engine 100, when the driver makes the deceleration request (turns the brake pedal ON). Specifically, "Vo−B" selected as the automatic travel driving target vehicle speed Vfa is a value for preventing excessively large drive force from being output from the engine 100. This "Vo−B" may be obtained beforehand even when the deceleration request is not made, in order to improve responsiveness of arithmetic processing. Note that "B" may be a fixed value that is set beforehand from an experiment or simulation, or may be a variable that is obtained based on the vehicle speed V, the gradient 8 of the road surface, the automatic travel target vehicle speed Vo and the like while monitoring them carefully.

[Target drive force Fo] The target drive force Fo that is generated when the vehicle automatically travels on the ascending slope at low speed is described.

The target drive force Fo in this case is obtained by the following Equation 3. Specifically, for this target drive force Fo, maximum values corresponding to a drive force Fa for achieving the automatic travel driving target vehicle speed Vfa (referred to as "automatic travel control target drive force" hereinafter), and of a drive force Fsu obtained as a result of the acceleration operation performed by the driver are obtained. The drive force Fsu obtained as a result of the acceleration operation performed by the driver is determined according to the accelerator opening, that is, the acceleration operation amount Ssu detected by the accelerator sensor 7.

Equation 3

$$Fo \leftarrow MAX(Fa, Fsu) \quad (3)$$

Specifically, as shown in FIG. 4, when the driver makes neither the acceleration request nor the deceleration request, the automatic travel target drive force Fao, calculated to obtain the automatic travel target vehicle speed Vo, is basically selected as the target drive force Fo in the case where the vehicle automatically travels on the ascending slope at low speed.

Here, when the driver makes the acceleration request (turns the accelerator pedal ON) while automatically traveling on the ascending slope at low speed, the automatic travel target drive force Fao is selected as the automatic travel control target drive force Fa until the drive force Fsu obtained as a result of the acceleration operation performed by the driver becomes larger than the automatic travel control target drive force Fa, and subsequently the drive force Fsu is gradually reduced to 0, as shown in FIG. 4. Therefore, until this phenomenon occurs, the automatic travel target drive force Fao is selected as the target drive force Fo. Then, when the drive force Fsu obtained as a result of the acceleration operation performed by the driver becomes larger than the automatic travel control target drive force Fa, the drive force Fsu is selected as the target drive force Fo, as shown in FIG. 4. Specifically, when the driver makes the acceleration request while automatically traveling on the ascending slope at low speed, the automatic travel target drive force Fao is selected as the target drive force Fo as long as the drive force Fsu does not exceed the automatic travel control target drive force Fa (automatic travel target drive force Fao). On the other hand, when the drive force Fsu exceeds the automatic travel control target drive force Fa, the drive force Fsu is selected as the target drive force Fo.

Note that immediately after the driver stops the acceleration operation (takes his foot off the brake pedal), the drive force Fsu conformed with the closing accelerator opening or diminishing acceleration operation amount Ssu is selected as the target drive force Fo, as shown in FIG. 4. Then, when the acceleration operation amount Ssu is no longer detected, the target drive force Fo is gradually increased to the abovementioned automatic travel target drive force Fao, as shown in FIG. 4.

On the other hand, under the condition where the driver makes the deceleration request while automatically traveling on the ascending slope at low speed (turns the brake pedal ON), the automatic travel control target drive force Fa is gradually reduced to 0, as shown in FIG. 4. Once the automatic travel control target drive force Fa becomes 0, the target drive force Fo is reduced to 0 until the driver stops the deceleration operation. When the driver stops the deceleration operation, the target drive force Fo that is increased gradually to the automatic travel target drive force Fao is selected in accordance with the abovementioned automatic travel driving target vehicle speed $Vfa\{=Vfa(n-1)+A\}$.

[Automatic travel braking target vehicle speed Vba] The automatic travel braking target vehicle speed Vba that is generated when the vehicle automatically travels on the ascending slope at low speed is described.

The automatic travel braking target vehicle speed Vba is obtained by the following Equation 4 (n=1, 2, 3, ...) when the driver makes neither the acceleration request nor the deceleration request during the automatic travel control. Specifically, when the driver makes neither the accelerati(on request nor the deceleration request while automatically traveling on the ascending slope at low speed, intermediate values corresponding to "Vba(n−1)+A," "MIN (Vba(n−1)−C, V)," and "Vo+D" are obtained.

Equation 4

$$Vba(n) \leftarrow MID(Vba(n-1)+A, MIN(Vba(n-1)-C, V), Vo+D) \quad (4)$$

Figure 3:
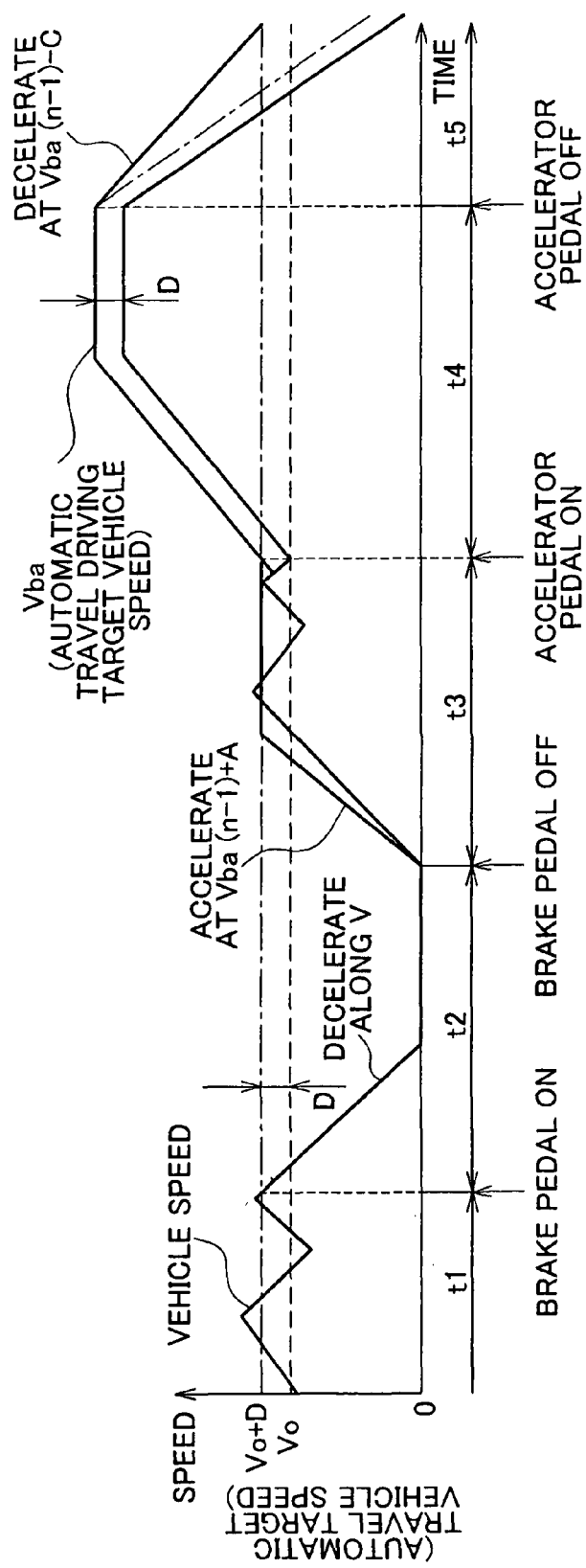
FIG. 3 is a time chart for explaining the automatic travel braking target vehicle speed.

Specifically, when the driver makes neither the acceleration request nor the deceleration request while automatically traveling on the ascending slope at low speed, the automatic travel braking target vehicle speed Vba is basically set at the value "Vo+D" that is higher than the automatic travel target vehicle speed Vo, as shown by time domains t1, t3 shown in FIG. 3 and as shown in FIG. 4. However, even under such a condition, immediately after the driver stops the acceleration operation (takes his foot off the accelerator pedal) in the middle of the acceleration operation (during the ON state of the accelerator pedal), "Vba(n−1)−C" is selected as the automatic travel braking target vehicle speed Vba to decelerate the vehicle toward the value "Vo+D" higher than the automatic travel target vehicle speed Vo, as shown by a time domain t5 shown in FIG. 3 and as shown in FIG. 4. Moreover, even under such a condition, immediately after the driver stops the deceleration operation (takes his foot off the brake pedal) in the middle of the deceleration operation (during the ON state of the brake pedal), "Vba(n−1)+A" is selected as the automatic travel braking target vehicle speed Vba to accelerate the vehicle toward "Vo+D" that is on the high-speed side of the automatic travel target vehicle speed Vo, as shown by a time domain t3 shown in FIG. 3 and as shown in FIG. 4.

Here, "Vba(n−1)" is the previously calculated automatic travel braking target vehicle speed Vba. "A" indicates the upper limit of the vehicle accelerated speed, as in the case described above, and "C" indicates the upper limit of a vehicle decelerated speed. In other words, "Vba(n−1)+A" that is selected as the automatic travel braking target vehicle speed Vba is the value for gradually and slowly accelerating the vehicle without accelerating the vehicle drastically so that the automatic travel braking target vehicle speed Vba does not become widely different from the automatic travel driving target vehicle speed Vfa. Also, "Vba(n−1)−C" that is selected as the automatic travel braking target vehicle speed Vba is the value for gradually and slowly decelerating the vehicle without decelerating the vehicle drastically. Note that "C" may be a fixed value that is set beforehand from an experiment or simulation, or may be a variable that is obtained based on the vehicle speed V during deceleration, the gradient θ of the road surface, the automatic travel target vehicle speed Vo and the like while monitoring them carefully. In addition, "D" is a setting speed for preventing the automatic travel braking target vehicle speed Vba and the automatic travel driving target vehicle speed Vfa from being coinciding with each other.

On the other hand, under the condition where the driver makes the deceleration request while automatically traveling on the ascending slope at low speed, the automatic travel braking target vehicle speed Vba is obtained by the following Equation 5 (n=1, 2, 3, ...). Specifically, in this case, minimum values corresponding to "V," "Vba(n−1)−C," and "Vo+D" are obtained.

Equation 5

$$Vba(n) \leftarrow MIN(V, Vba(n-1)-C, Vo+D) \quad (5)$$

In this case, the vehicle speed V of the vehicle is selected as the automatic travel braking target vehicle speed Vba as shown by a time domain t2 shown in FIG. 3 and as shown in FIG. 4, so that a braking force Ba for achieving the automatic travel braking target vehicle speed Vba (referred to as "automatic travel control target braking force" hereinafter) is prevented from acting on the vehicle when the driver makes the deceleration request.

Furthermore, under the condition where the driver makes the acceleration request is made while automatically traveling on the ascending slope at low speed, the automatic travel braking target vehicle speed Vba is obtained by the following Equation 6 (n=1, 2, 3, ... ). Specifically, in this case, maximum values corresponding to "V+D" and "Vo+D" are obtained.

Equation 6

$$Vba(n) \leftarrow MAX(V+D, Vo+D) \quad (6)$$

Here, in this case, the value "V+D" higher than the current vehicle speed V is selected as the automatic travel braking target vehicle speed Vba as shown by a time domain t4 shown in FIG. 3 and as shown in FIG. 4, so as to prevent the automatic travel control target braking force Ba from acting on the vehicle when the driver shows a willingness to accelerate.

[Target braking force Bo] The target braking force Bo that is generated when the vehicle automatically travels on the ascending slope at low speed is described.

The target braking force Bo in this case is obtained by the following Equation 7. Specifically, for the target braking force Bo, maximum values corresponding to the automatic travel control target braking force Ba and a braking force Bsd generated by the deceleration operation performed by the driver are obtained. The braking force Bsd generated by the deceleration operation performed by the driver is determined according to the deceleration operation amount Ssd detected by the brake sensor 6.

Equation 7

$$Bo \leftarrow MAX(Ba, Bsd) \quad (7)$$

Specifically, if the driver does not make the deceleration request, even when the driver makes the acceleration request, 0 is basically selected as the target braking force Bo that is generated when the vehicle automatically travels on the ascending slope at low speed, as shown in FIG. 4.

On the other hand, under the condition where the driver makes the deceleration request (turns the brake pedal ON) while automatically traveling on the ascending slope at low speed, the braking force Bsd generated by the driver's deceleration request is selected as the target braking force Bo as shown in FIG. 4. Specifically, the target braking force Bo in this case is the braking force Bsd that is increased with a change in the deceleration operation amount Ssd.

Note that when the driver stops the deceleration operation, the braking force Bsd conformed with the diminishing deceleration operation amount Ssd is selected as the target braking force Bo as shown in FIG. 4.

{Automatically traveling on a descending slope at low speed} Next, the case where the vehicle automatically travels along a descending slope at low speed is described.

[Automatic travel driving target vehicle speed Vfa] First of all, the automatic travel driving target vehicle speed Vfa obtained in this case is described.

Figure 5:
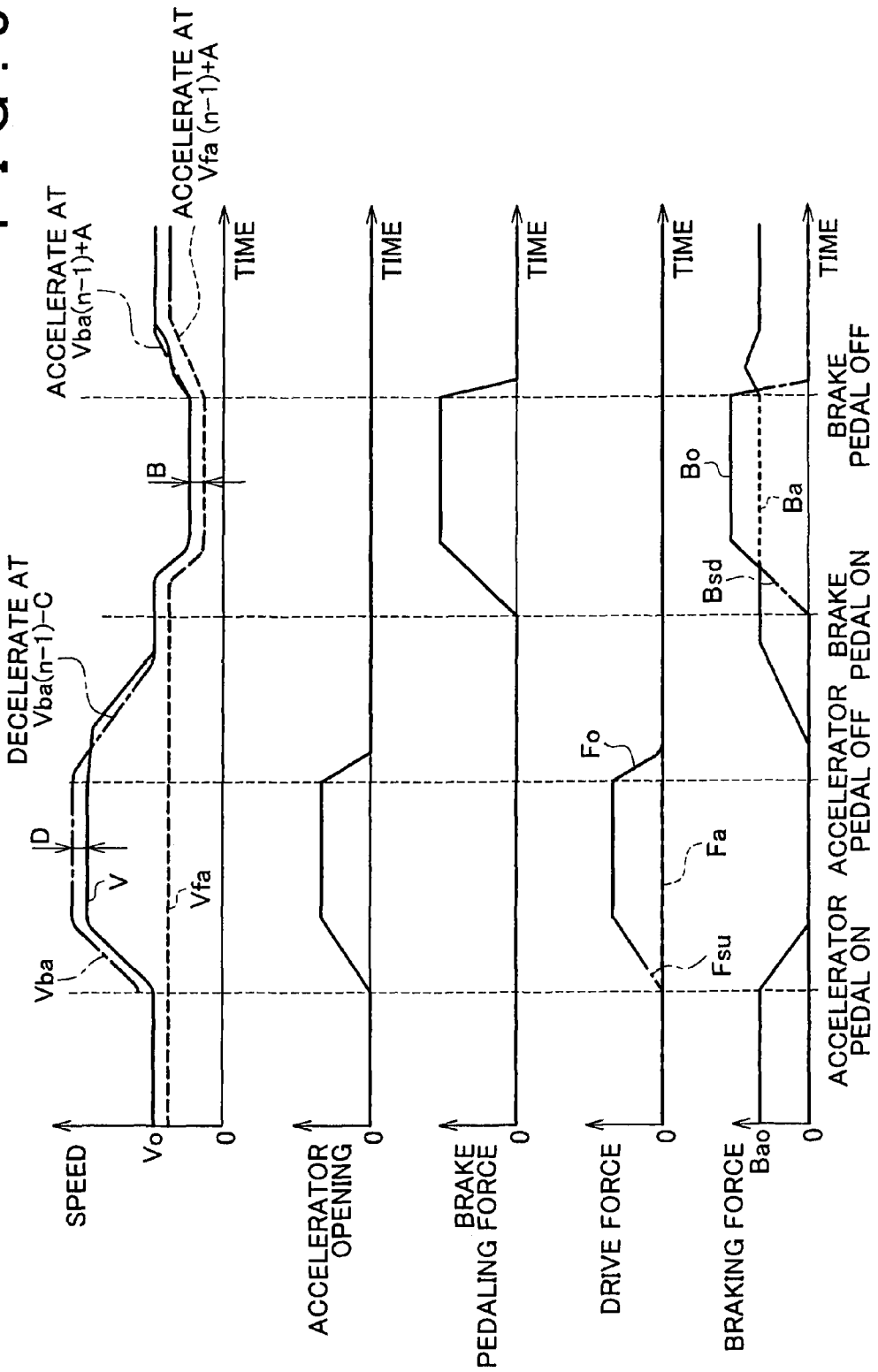
FIG. 5 is a time chart for explaining an operation performed by the vehicle travel control device of Embodiment 1 during travel on a descending slope.

Under the condition where the driver does not make the deceleration request while automatically traveling on a descending slope at low speed, even when the driver makes the acceleration request, the value "Vo−D" that is lower than the automatic travel target vehicle speed Vo is basically selected as the automatic travel driving target vehicle speed Vfa as shown in FIG. 5. However, even under such a condition, immediately after the driver stops the deceleration operation (takes his foot off the brake pedal) in the middle of the deceleration operation (during the ON state of the brake pedal), "Vfa(n−1)+A" is selected as the automatic travel driving target vehicle speed Vfa, as in the case of the ascending slope, to gradually accelerate the vehicle toward the value "Vo−D" lower than the abovementioned automatic travel target vehicle speed Vo, as shown in FIG. 5. That is, in this case, the automatic travel driving target vehicle speed Vfa is obtained by the following Equation 8 (n=1, 2, 3, ... ). As in the case of the ascending slope, "D" is used here as well, but setting speed may be set at a value varying between the ascending slope and the descending slope so that the automatic travel driving target vehicle speed Vfa and the automatic travel braking target vehicle speed Vba do not coincide with each other.

Equation 8

$$Vfa(n) \leftarrow MIN(Vfa(n-1)+A, Vo-D) \quad (8)$$

On the other hand, under the condition where the driver makes the deceleration request while automatically traveling on the descending slope at low speed, the value "V−B" that is lower than the vehicle speed V is selected as the automatic travel driving target vehicle speed Vfa when the deceleration request is made, as shown in FIG. 5. Specifically, in this case; the automatic travel driving target vehicle speed Vfa is obtained by the following Equation 9 (n=1, 2, 3, ... ).

Equation 9

$$Vfa(n) \leftarrow MIN(V-B, Vfa(n-1)+A, Vo-D) \quad (9)$$

[Target drive force Fo] The target drive force Fo generated when the vehicle automatically travels on the descending slope at low speed is described.

The target drive force Fo in this case is obtained by the above Equation 3, as in the case of the ascending slope. More specifically, basically 0 is selected as the target drive force Fo in this case as shown in FIG. 5, if the driver does not make the acceleration request, even when the driver makes the deceleration request. However, even under such a condition, when the driver stops the acceleration operation (takes his foot off the accelerator pedal), the drive force Fsu conformed with the closing accelerator opening or diminishing acceleration operation amount Ssu is selected as the target drive force Fo, as shown in FIG. 5.

On the other hand, when the driver makes the acceleration request (turns the accelerator pedal ON) while automatically traveling on the descending slope at low speed, the drive force Fsu generated by the acceleration operation performed by the driver is selected as the target drive force Fo in this case, as shown in FIG. 5. Specifically, the target drive force Fo in this case is the drive force Fsu corresponding to the accelerator opening.

[Automatic travel braking target vehicle speed Vba] The automatic travel braking target vehicle speed Vba that is generated when the vehicle automatically travels on the descending slope at low speed is described.

The automatic travel braking target vehicle speed Vba in this case is obtained by the following Equation 10 (n=1, 2, 3, ... ) when the driver makes neither the acceleration request nor the deceleration request during the automatic travel control.

Equation 10

$$Vba(n) \leftarrow MID(Vba(n-1)+A, MIN(Vba(n-1)-C, V), Vo) \quad (10)$$

More specifically, under the condition where the driver makes neither the acceleration request nor the deceleration request while automatically traveling on the descending slope at low speed, the automatic travel braking target vehicle speed Vba is basically set at the automatic travel target vehicle speed Vo as shown in FIG. 5. However, even under such a condition, immediately after the driver stops the acceleration operation (takes his foot off the accelerator pedal) during the acceleration operation (during the ON state of the accelerator pedal), "Vba(n−1)−C" is selected as the automatic travel braking target vehicle speed Vba, as in the case of the ascending slope, to gradually and slowly decelerate the vehicle toward the automatic travel target vehicle speed Vo, as shown in FIG. 5. Furthermore, even under this condition, immediately after the driver stops the deceleration operation (takes his foot off the brake pedal) during the deceleration operation (during the ON state of the brake pedal), "Vba(n−1)+A" is selected as the automatic travel braking target vehicle speed Vba, as in the case of the ascending slope, to gradually and slowly accelerate the vehicle toward the automatic travel target vehicle speed Vo, as shown in FIG. 5.

On the other hand, under the condition where the driver makes the deceleration request while automatically traveling on the descending slope at low speed, the automatic travel braking target vehicle speed Vba is obtained by the following Equation 11 (n=1, 2, 3, . . . ).

Equation 11

$$Vba(n) \leftarrow MIN(V, Vba(n-1)-C, Vo) \quad (11)$$

In this case, as in the case of the ascending slope, the vehicle speed V of the vehicle is selected as the automatic travel braking target vehicle speed Vba as shown in FIG. 5 so as to prevent the automatic travel control target braking force Ba from acting on the vehicle when the driver makes the deceleration request.

Also, under the condition where the driver makes the acceleration request while automatically traveling on the descending slope at low speed, the automatic travel braking target vehicle speed Vba is obtained by the following Equation 12 (n=1, 2, 3, . . . ).

Equation 12

$$Vba(n) \leftarrow MAX(V+D, Vo) \quad (12)$$

Here, in this case, as in the case of the ascending slope, the value "V+D" that is higher than the current vehicle speed V is selected as the automatic travel braking target vehicle speed Vba as shown in FIG. 5, so as to prevent the automatic travel control target braking force Ba from acting on the vehicle when the driver shows a willingness to accelerate.

[Target braking force Bo] The target braking force Bo that is generated when the vehicle automatically travels on the descending slope at low speed is described.

The target braking force Bo in this case is obtained by the above Equation 7, as in the case of the ascending slope. More specifically, when the driver makes neither the acceleration request nor the deceleration request, the automatic travel target braking force Bao that is calculated to achieve the automatic travel target vehicle speed Vo is basically selected as the target braking force Bo in this case, as shown in FIG. 5.

On the other hand, under the condition where the driver makes the acceleration request (turns the accelerator pedal ON) while automatically traveling on the descending slope at low speed, the automatic travel control target braking force Ba is selected as the target braking force Bo, as shown in FIG. 5, because the automatic travel control target braking force Ba gradually decreases toward 0. Specifically, in this case, the target braking force Bo gradually decreases toward 0. When the driver stops the acceleration operation, for example the target drive force Fo becomes 0 and subsequently the automatic travel control target braking force Ba gradually increases toward the automatic travel target braking force Bao. For this reason, the automatic travel control target braking force Ba is selected as the target braking force Bo. In other words, the target braking force Bo that is obtained when the driver stops the acceleration operation gradually increases toward the automatic travel target braking force Bao once the target drive force Fo becomes 0.

Also, under the condition where the driver makes the deceleration request (turns the brake pedal ON), selection of the target braking force Bo is performed based on the relationship between the automatic travel control target braking force Ba and the braking force Bsd generated by the deceleration request of the driver, as shown in FIG. 5. More specifically, the automatic travel target braking force Bao is constantly selected as the automatic travel control target braking force Ba in this case as shown in FIG. 5. On the other hand, the braking force Bsd generated by the deceleration request of the driver increases in accordance with the deceleration operation amount Ssd. Furthermore, the automatic travel target braking force Bao is selected as the target braking force Bo in this case when this braking force Bsd does not exceed the automatic travel control target braking force Ba (i.e., the automatic travel target braking force Bao), and the braking force Bsd is selected when the braking force Bsd exceeds the automatic travel control target braking force Ba.

Here, when the driver stops the deceleration operation while automatically traveling on the descending slope at low speed, the braking force Bsd is reduced with a decrease in the deceleration operation amount Ssd as shown in FIG. 5. For this reason, in this circumstance the automatic travel control target braking force Ba selected as the target braking force Bo is gradually increased as shown in FIG. 5, to gradually accelerate the vehicle toward the automatic travel target vehicle speed Vo at "Vba(n−1)+A" described above. Note that the automatic travel control target braking force Ba selected as the target braking force Bo is gradually reduced at a certain point toward the automatic travel target braking force Bao.

The engine ECU 9 is a first ECU. The engine ECU 9 controls the engine 100 based on the target drive force Fo. Here, the engine ECU 9 is connected to the automatic travel control ECU 8 and controls the engine 100 based on the target drive force Fo that is calculated and output by the automatic travel control ECU 8.

The brake ECU 10 is a second ECU. The brake ECU 10 controls the brake device 200 based on the target braking force Bo. Here, the braking ECU 10 is connected to the automatic travel control ECU 8 and controls the brake device 200 based on the target braking force Bo that is calculated and output by the automatic travel control ECU 8.

Next, a vehicle travel control method in which the vehicle travel control device 1-1 of Embodiment 1 is used is described with reference to the flowcharts of FIGS. 6 to 9. Note that the automatic travel control is carried out by the vehicle travel control device 1-1 in each control cycle thereof.

Figure 6:
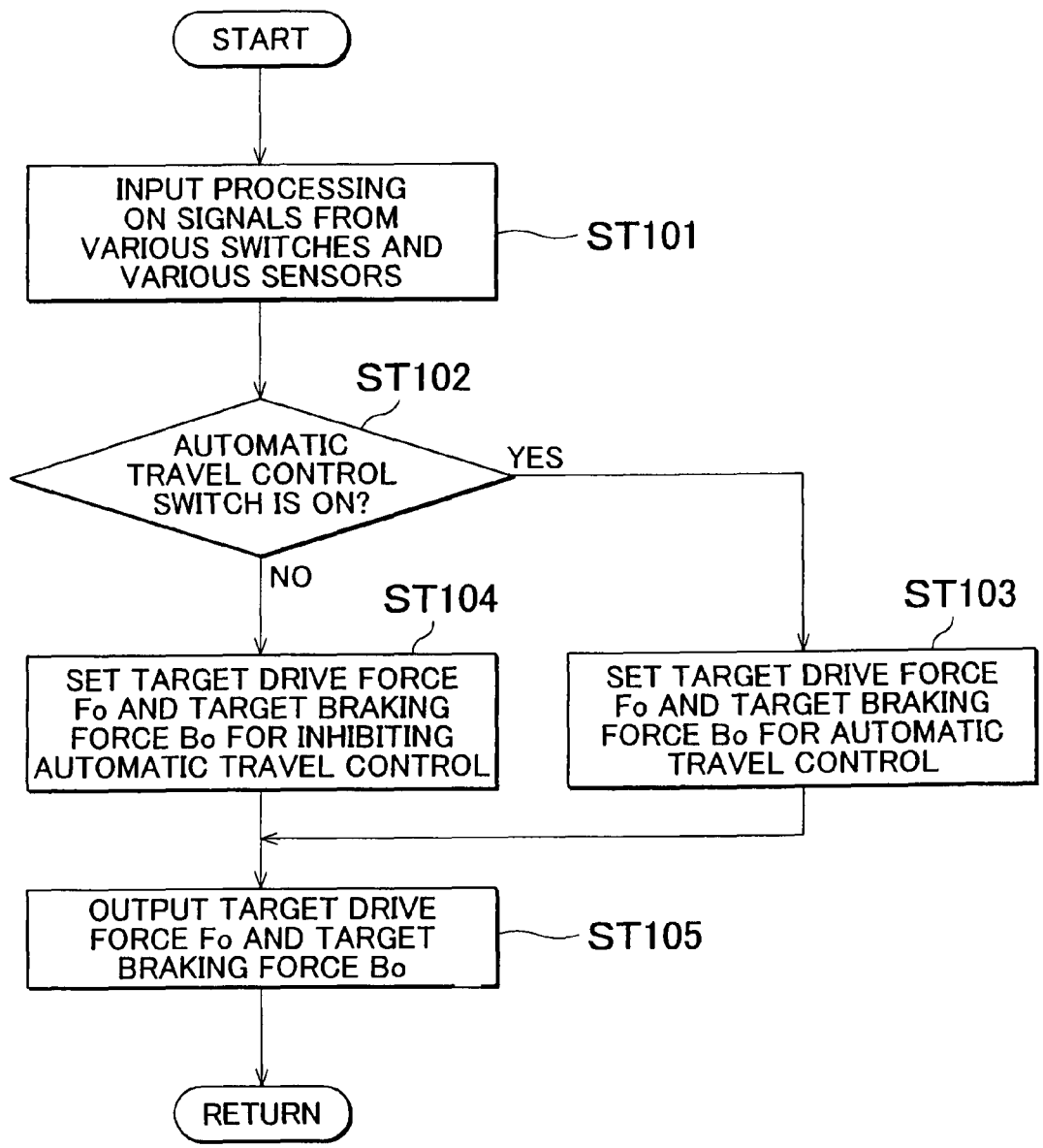
FIG. 6 is a flowchart showing an example of an arithmetic processing operation performed by an automatic travel control ECU of Embodiment 1.

First of all, an arithmetic processing operation that is performed by the automatic travel control ECU 8 is described using the flowchart of FIG. 6.

First, the automatic travel control ECU 8 performs input processing on signals transmitted from various switches and various sensors (step ST101). Here, the signals input to the automatic travel control ECU 8 are a signal associated with the ON/OFF state of the automatic travel control switch 2, a signal associated with the vehicle speed V detected by the vehicle speed sensor 3, and a signal associated with the gradient θ detected by the G sensor 4.

Next, the automatic travel control determination part 81 of the automatic travel control ECU 8 determines whether or not the automatic travel control switch 2 is ON (step ST102). Specifically, the automatic travel control ECU 8 determines the presence of willingness of the driver to start the automatic travel control. Such determination is made based on the signal associated with the ON/OFF state of the automatic travel control switch 2 that is acquired in step ST101 or, specifically, based on whether or not the ON signal is input from the automatic travel control switch 2.

Here, when it is determined that the automatic travel control switch 2 is ON, the automatic travel control ECU 8 calculates and sets the target drive force Fo and target braking force Bo for performing the automatic travel control (step ST103).

When, on the other hand, it is determined in step ST102 that the automatic travel control switch 2 is OFF, the automatic travel control ECU 8 calculates and sets the target drive force Fo and target braking force Bo for inhibiting the automatic travel control (step ST104). Concretely, when the driver does not show a willingness to start the automatic travel control, that is, when the automatic travel control is not carried out, the automatic travel control ECU 8 sets the target drive force Fo so that the engine 100 docs not output a drive force based on the target drive force Fo generated from the automatic travel control ECU 8, and further sets the target braking force Bo so that the brake device 200 does not output a braking force based on the target braking force Bo generated from the automatic travel control ECU 8. For example, the drive force calculation part 84 of Embodiment 1 obtains a value at which the engine 100 actually outputs 0N (e.g., 0N or −15000N which cannot be actually output by the engine 100). The braking force calculation part 86 of Embodiment 1 also obtains a value at which the brake device 200 actually outputs 0N.

After the target drive force Fo and the target braking force Bo are set as described above, the automatic travel control ECU 8 of Embodiment 1 outputs the set target drive force Fo and target braking force Bo to the engine ECU 9 and the brake ECU 10 respectively (step ST105). Note that once the automatic travel control ECU 8 outputs the target drive force Fo to the engine ECU 9, the automatic travel control ECU 8 ends the current control cycle to proceed to the next control cycle.

Figure 7:
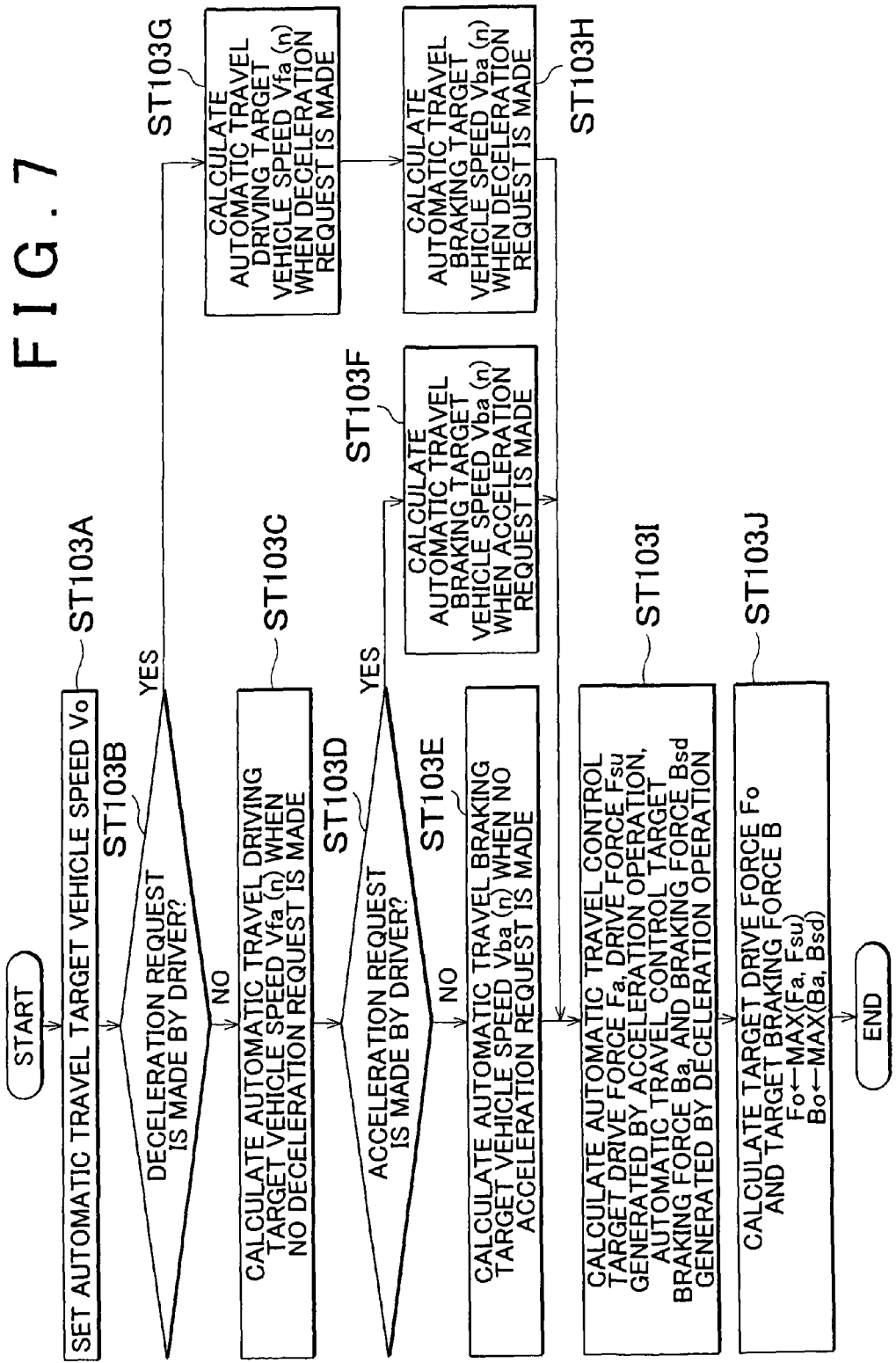
FIG. 7 is a flowchart showing an operation for setting a target drive force and target braking force during automatic travel control according to Embodiment 1.

Here, the arithmetic processing performed in the abovementioned step ST103, that is, the arithmetic processing performed on the target drive force Fo and the target braking force Bo for the automatic travel control, is described with reference to the flowchart of FIG. 7.

First, the automatic travel target vehicle speed setting part 82 of the automatic travel control ECU 8 sets the automatic travel target vehicle speed Vo (step ST103A). The automatic travel target vehicle speed setting part 82 sets the previously determined automatic travel target vehicle speed Vo when the automatic travel control switch 2 is merely switched between ON and OFF, as described above. Also, when the automatic travel control switch 2 switches between a plurality of different target speed levels, the automatic travel target vehicle speed setting part 82 sets the automatic travel target vehicle speed Vo corresponding to the level selected by the operator.

The automatic travel control ECU 8 of Embodiment 1 determines whether or not the driver makes the deceleration request during the automatic travel control, that is, whether or not the ON signal is received from the brake switch 5 or the deceleration operation amount Ssd is received from the brake sensor 6 during the automatic travel control (step ST103B).

When it is determined in step ST103B that the deceleration request is not set, the driving target vehicle speed calculation part 83 of the automatic travel control ECU 8 calculates the automatic travel driving target vehicle speed Vfa(n) (step ST103C).

When it is determined in step ST103C that the traveling road is an ascending slope due to the gradient θ that is detected by the G sensor 4 in step ST101, the automatic travel target vehicle speed Vo that is set in step ST103A is basically obtained as the automatic travel driving target vehicle speed Vfa, as shown in FIG. 4. When, on the other hand, it is determined that the traveling road is a descending slope, the value "Vo−D" that is lower than the abovementioned automatic travel target vehicle speed Vo is basically obtained as the target travel driving target vehicle speed Vfa in step ST103C, as shown in FIG. 5.

On the other hand, in step ST103C, the abovementioned value "Vfa(n−1)+A" is derived as the automatic travel driving target vehicle speed Vfa regardless of whether the traveling road is an ascending slope or descending slope, immediately after the driver stops the deceleration operation (takes his foot off the brake pedal) during the deceleration operation (when the brake pedal is in the ON state). Specifically, at this moment, the automatic travel driving target vehicle speed Vfa that gradually and slowly accelerates the vehicle toward the automatic travel target vehicle speed Vo is set.

Subsequently, the automatic travel control ECU 8 of Embodiment 1 determines whether or not the driver makes the acceleration request during the automatic travel control, that is, whether or not the acceleration operation amount Ssu is received from the accelerator sensor 7 during the automatic travel control (step ST103D).

When it is determined in step ST103D that the acceleration request is not made, the braking target vehicle speed calculation part 85 of the automatic travel control ECU 8 calculates the automatic travel braking target vehicle speed Vba(n) (step ST103E).

When it is determined in step ST103E that the traveling road is an ascending slope, the value "Vo+D" that is on the high-speed side of the abovementioned automatic travel target vehicle speed Vo is basically obtained as the automatic travel braking target vehicle speed Vba, as shown in FIG. 4. When, on the other hand, it is determined that the traveling road is a descending slope, the automatic travel braking target vehicle speed Vba is basically set as the abovementioned automatic travel target vehicle speed Vo in step ST103E, as shown in FIG. 5.

On the other hand, in step ST103E, the abovementioned value "Vba−1)−C" is derived as the automatic travel braking target vehicle speed Vba regardless of whether the traveling road is an ascending slope or descending slope, immediately after the driver stops the acceleration operation (takes his foot off the accelerator pedal) during the acceleration operation (when the accelerator pedal is in the ON state). At this moment, the automatic travel braking target vehicle speed Vba decelerates the vehicle toward the value "Vo+D" that is on the high-speed side of the automatic travel target vehicle speed Vo when the traveling road is an ascending slope, and decelerates the vehicle to the automatic travel target vehicle speed Vo when the traveling road is a descending slope. In step ST103E, the abovementioned value "Vba(n−1)+A" is derived as the automatic travel braking target vehicle speed Vba regardless of whether the traveling road is an ascending slope or descending slope, immediately after the driver stops the deceleration operation during the deceleration operation (when the accelerator pedal is in the ON state). At this moment, the automatic travel braking target vehicle speed Vba gradually and slowly accelerates the vehicle speed toward the value "Vo+D" that is on the high-speed side of the automatic travel target vehicle speed Vo when the traveling road is an ascending slope, and gradually and slowly accelerates the vehicle toward the automatic travel target vehicle speed Vo when the traveling road is a descending slope.

When it is determined in step ST103D that the acceleration request is made, the braking target vehicle speed calculation part 85 of Embodiment 1 calculates the automatic travel braking target vehicle speed Vba(n) (step ST103F).

In step ST103F, the value "V+D" that is on the high-speed side of the current vehicle speed V is obtained as the automatic travel braking target vehicle speed Vba, as shown in FIG. 4 or 5, regardless of whether the traveling road is an ascending slope or descending slope. Specifically, the automatic travel braking target vehicle speed Vba is set so as to prevent the automatic travel control target braking force Ba from acting on the vehicle when the driver shows a willingness to accelerate.

Also, when it is determined in step ST103B that the deceleration request is made, the driving target vehicle speed calculation part 83 of Embodiment 1 calculates the automatic travel driving target vehicle speed Vfa(n) (step ST103G).

When it is determined in step ST103G that the traveling road is an ascending slope, the value "Vo−B" that is on the low-speed side of the automatic travel target vehicle speed Vo is obtained as the automatic travel driving target vehicle speed Vfa, as shown in FIG. 4. Also, when it is determined in step ST103G that the traveling road is a descending slope, the automatic travel driving target vehicle speed Vfa is gradually reduced to 0, as shown in FIG. 5, which is continuously performed until the driver stops the deceleration operation.

Then, when the driver makes the deceleration request, the braking target vehicle speed calculation part 85 of Embodiment 1 calculates the automatic travel braking target vehicle speed Vba(n) (step ST103H).

In step ST103H, the vehicle speed V of the vehicle is obtained as the automatic travel braking target vehicle speed Vba, as shown in FIG. 4 or 5, regardless of whether the traveling road is an ascending slope or descending slope. Specifically, the automatic travel braking target vehicle speed Vba is set so as to prevent the automatic travel control target braking force Ba from acting on the vehicle when the driver makes the deceleration request.

After the automatic travel driving target vehicle speed Vfa and the automatic travel braking target vehicle speed Vba are obtained in this manner described above, the drive force calculation part 84 of Embodiment 1 obtains the automatic travel control target drive force Fa and the drive force Fsu generated by the acceleration operation performed by the driver, while the braking force calculation part 86 obtains the automatic travel control target braking force Ba and the braking force Bsd generated by the deceleration operation performed by the driver (step ST103I).

In step ST103I, the drive force calculation part 84 calculates the automatic travel control target drive force Fa based on the automatic travel driving target vehicle speed Vfa obtained as described above. The drive force calculation part 84 also calculates in step ST103I the drive force Fsu generated by the acceleration operation performed by the driver, when the accelerator sensor 7 detects the acceleration operation amount Ssu or, in other words, when the accelerator pedal is pushed down. Moreover, in step ST103I, the braking force calculation part 86 calculates the automatic travel control target braking force Ba based on the automatic travel braking target vehicle speed Vba obtained as described above. The braking force calculation part 86 calculates in step ST103I the braking force Bsd generated by the deceleration operation performed by the driver, when the brake pedal sensor 6 detects the deceleration operation amount Ssd or, in other words, the brake pedal is pushed down.

Then, the drive force calculation part 84 calculates the target drive force Fo, while the braking force calculation part 86 calculates the target braking force Bo (step ST103J).

In step ST103J, when the traveling road is an ascending slope and the driver makes neither the acceleration request nor the deceleration request, the automatic travel target vehicle speed Vo is basically obtained as the target drive force Fo and 0 is obtained as the target braking force Bo, as shown in FIG. 4. When, on the other hand, the traveling road is a descending slope and the driver makes neither the acceleration request nor the deceleration request, 0 is basically obtained as the target drive force Fo and the automatic travel target braking force Bao is obtained as the target braking force Bo, as shown in FIG. 5.

Furthermore, in step ST103J, when the traveling road is an ascending slope and the driver makes the acceleration request, the drive force Fsu generated by the acceleration operation performed by the driver is obtained as the target drive force Fo when the drive force Fsu exceeds the automatic travel control target drive force Fa (automatic travel target drive force Fao), as shown in FIG. 4. In this case, 0 is obtained as the target braking force Bo. Moreover, when the traveling road is a descending slope and the driver makes the acceleration request, the drive force Fsu generated by the acceleration operation performed by the driver is obtained as the target drive force Fo, and the target braking force Bo which is obtained by gradually reducing the automatic travel target braking force Bao to 0 is obtained, as shown in FIG. 5. At this moment, this target braking force Bo is conformed with the automatic travel control target braking force Ba. Therefore, when the driver makes the acceleration request, the automatic travel braking target vehicle speed Vba is set at a value on the high-speed side of the vehicle speed V of the vehicle, regardless of whether the traveling road is an ascending slope or descending slope. For this reason, the automatic travel control target braking force Ba can be prevented from acting on the vehicle in this case, and the vehicle can be accelerated as intended by the driver.

When the driver stops the acceleration operation, the drive force Fsu corresponding to the diminishing acceleration operation amount Ssu is obtained as the target drive force Fo, as shown in FIG. 4. Even when the driver stops the acceleration operation, the target braking force Bo remains 0 or small drive force generated by the automatic travel control target braking force Ba. In this case, therefore, because the vehicle speed V of the vehicle is gradually and slowly reduced to the automatic travel target vehicle speed Vo, the vehicle is decelerated moderately even when the driver stops the acceleration operation suddenly. For this reason, the driver's operation on the accelerator pedal causes less discomfort even if the behavior (sudden deceleration) of the vehicle is not what is intended by the driver. In addition, even when the automatic travel control is suddenly ended during the operation of the accelerator pedal, the drive force Fsu generated by the operation of the accelerator pedal can be maintained, and hence further reduction of the discomfort can be realized.

Note that in the case where the traveling road is an ascending slope and the driver makes the acceleration request, the automatic travel target drive force Fao is obtained as the target drive force Fo when the drive force Fsu generated by the acceleration operation does not exceed the automatic travel control target drive force Pa (automatic travel target drive force Fao). Then, when the driver stops the acceleration operation at this moment, this automatic travel target drive force Fao is obtained as-is as the target drive force Fo. In this case, the target drive force Bo remains 0.

When it is determined in step ST103J that the traveling road is an ascending slope and the driver makes the deceleration request, the target drive force Fo which is obtained by gradually reducing the automatic travel target drive force Fao to 0 is obtained, and the braking force Bsd generated by the deceleration request is obtained as the target braking force Bo, as shown in FIG. 4. Moreover, when it is determined that the traveling road is a descending slope and the driver makes the deceleration request, 0 is obtained as the target drive force Fo, as shown in FIG. 5. In this case, when the braking force Bsd generated by the driver's deceleration request exceeds the automatic travel control target braking force Ba (automatic travel target braking force Bao) as shown in FIG. 5, this braking force Bsd is obtained as the target braking force Bo. Specifically, when the driver makes the deceleration request, the automatic travel braking target vehicle speed Vba is conformed with the vehicle speed V of the vehicle, regardless of whether the traveling road is an ascending slope or descending slope. Therefore, the automatic travel control target braking force Ba can be prevented from acting on the vehicle, and the vehicle can be decelerated as intended by the driver.

When the traveling road is an ascending road and the driver stops the deceleration operation, the target drive force Fo that is increased gradually to the automatic travel target drive force Fao is obtained, and the braking force Bsd corresponding to the diminishing deceleration operation amount Ssd is obtained as the target braking force Bo, as shown in FIG. 4. For this reason, the vehicle can be gradually and slowly accelerated to the automatic travel target vehicle speed Vo. Furthermore, when the traveling road is a descending slope and the driver stops the deceleration operation, 0 is obtained as the target drive force Fo, as shown in FIG. 5. At this moment, because the braking force Bsd generated by the driver's deceleration request is reduced with a decrease in the deceleration operation amount Ssd, the target braking force Bo is gradually increased accordingly. Specifically, in this case, the vehicle can be gradually and slowly accelerated to the automatic travel target vehicle speed Vo. Therefore, when the driver stops the deceleration operation, the vehicle speed V of the vehicle is gradually and slowly accelerated to the automatic travel target vehicle speed Vo regardless of whether the traveling road is an ascending slope or descending slope, the vehicle is accelerated moderately even when the driver stops the deceleration operation suddenly; For this reason, the driver's operation on the brake pedal causes less discomfort even if the behavior (sudden acceleration) of the vehicle is not what is intended by the driver. In addition, even when the automatic travel control is suddenly ended during the operation of the brake pedal, the braking force Bsd generated by the operation of the brake pedal can be maintained, and hence further reduction of the discomfort can be realized.

Figure 8:
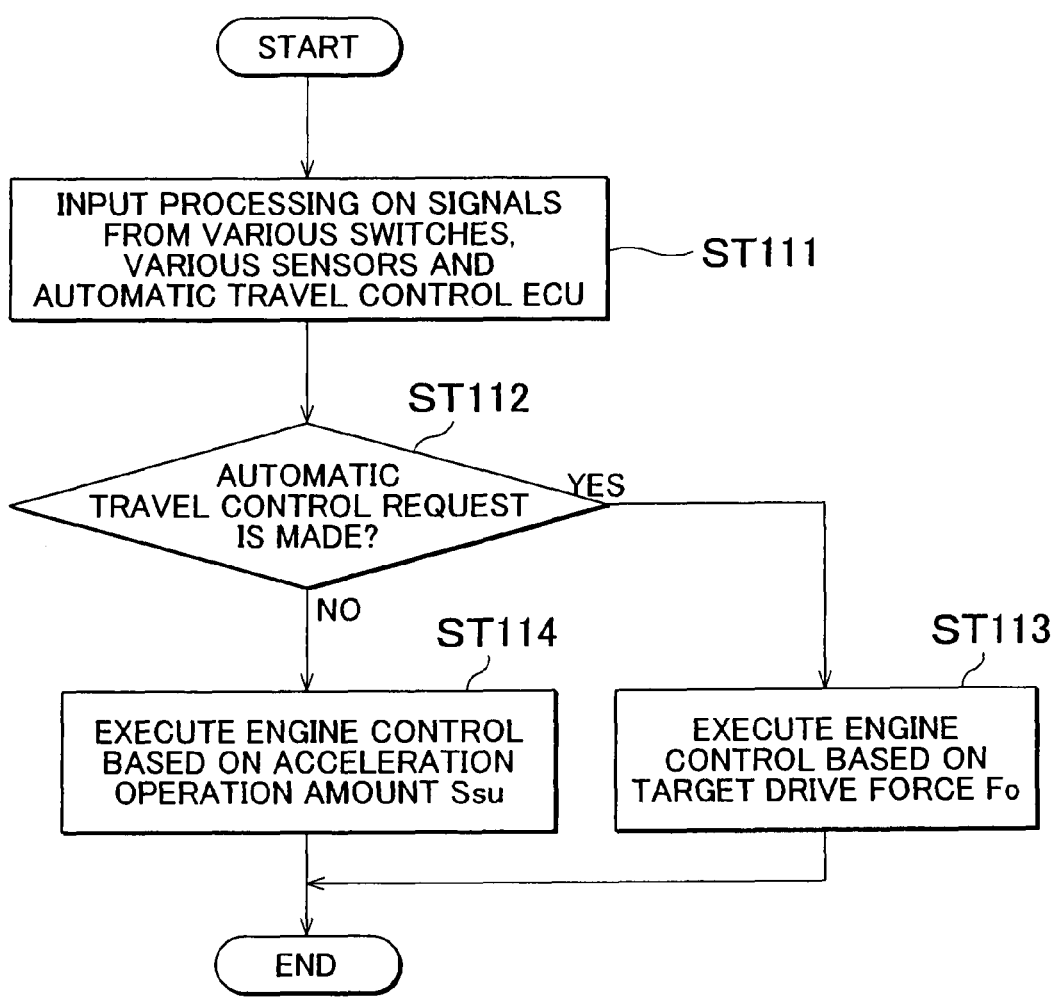
FIG. 8 is a flowchart showing an example of an arithmetic processing operation performed by an engine ECU of Embodiment 1.

Next, an arithmetic processing operation that is performed by the engine ECU 9 is described using the flowchart of FIG. 8.

First, the engine ECU 9 performs input processing on signals transmitted from the various switches, the various sensors, and the automatic travel control ECU 8 (step ST111). Here, the signals input to the engine ECU 9 are a signal associated with the acceleration operation amount Ssu detected by the accelerator sensor 7, and a signal associated with the target drive force Fo output by the automatic travel control ECU 8.

This engine ECU 9 determines whether or not the automatic travel control is requested (step ST112). Such determination is made based on whether the target drive force Fo received from the automatic travel control ECU 8 is a value other than ON and greater than a predetermined value (here, −15000N). Specifically, when the target drive force Fo is a value other than ON and greater than the predetermined value, the engine ECU 9 determines that the automatic travel control is requested. Here, the automatic travel control switch 2 may also be connected to the engine ECU 9 to cause the engine ECU 9 to determine whether the automatic travel control is requested when the ON signal is input from the automatic travel control switch 2.

Here, when it is determined that the automatic travel control is requested, the engine ECU 9 controls the engine 100 based on the target drive force Fo received from the automatic travel control ECU 8 (step ST113).

When, on the other hand, it is determined in step ST112 that the automatic travel control request is not requested, the engine ECU 9 controls the engine 100 based on the acceleration operation amount Ssu (normal engine control) (step ST114).

Figure 9:
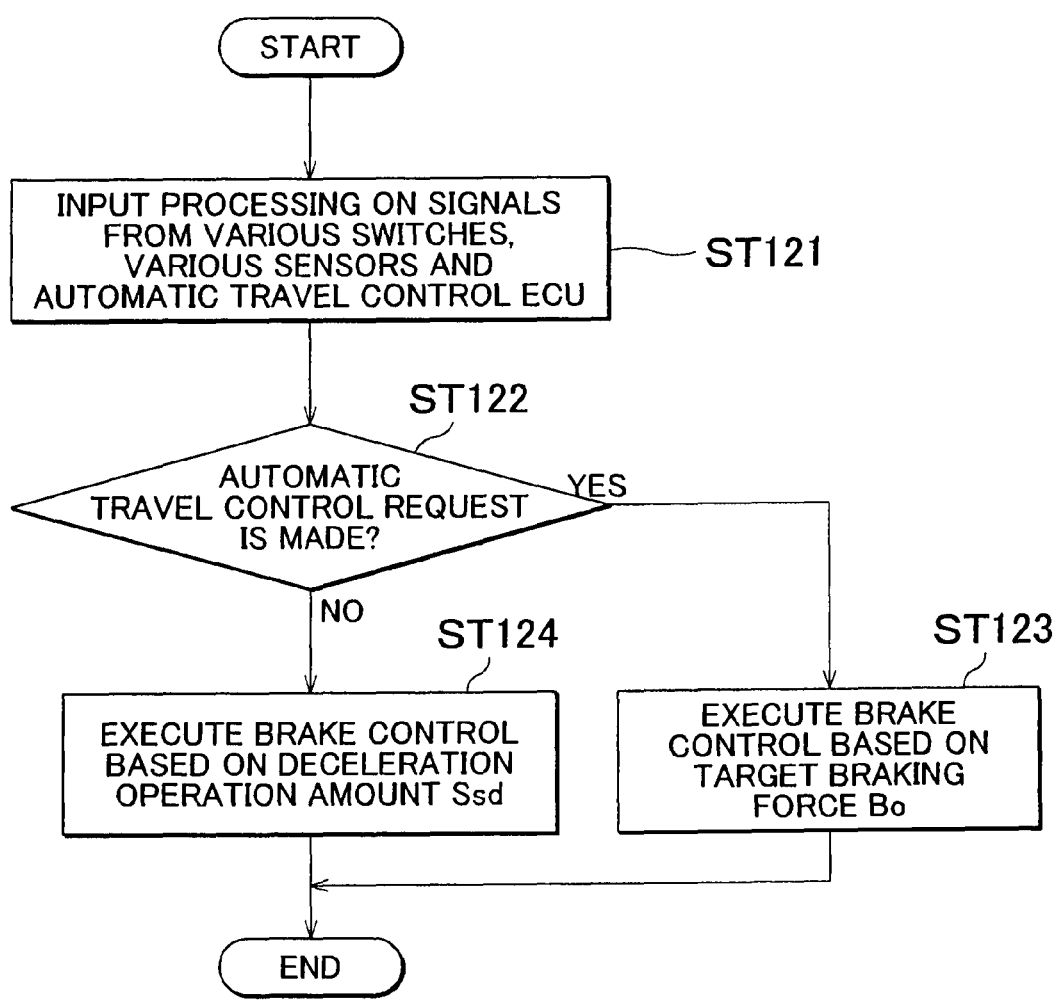
FIG. 9 is a flowchart showing an example of an arithmetic processing operation performed by a brake ECU of Embodiment 1.

Next, an arithmetic processing operation that is performed by the brake ECU 10 is described using the flowchart of FIG. 9.

First, the brake ECU 10 performs input processing on signals transmitted from the various switches, the various sensors, and the automatic travel control ECU 8 (step ST121). Here, the signals input to the brake ECU 10 are a signal associated with the deceleration operation amount Ssd detected by the brake sensor 6, and a signal associated with the target braking force Bo output by the automatic travel control ECU 8.

The brake ECU 10 determines whether or not the automatic travel control is requested (step ST122). In this determination, for example, the automatic travel control switch 2 is connected to the brake ECU 10 as well to determine that the automatic travel control is requested when the ON signal is input from the automatic travel control switch 2.

Here, when it is determined that the automatic travel control is requested, the brake ECU 10 controls the brake device 200 based on the target braking force Bo received from the automatic travel control ECU 8 (step ST123).

When, on the other hand, it is determined in step ST122 that the automatic travel control is not requested, the brake ECU 10 controls the brake device 200 based on the deceleration operation amount Ssd (normal brake control) (step ST124).

As described above, the vehicle travel control device 1-1 of Embodiment 1 enables the driver to accelerate the vehicle as intended when the driver operates the accelerator pedal during the automatic travel control and accordingly the acceleration operation performed by the driver is prioritized. Also, when the driver stops the acceleration operation with the accelerator pedal, the vehicle travel control device 1-1 gradually and slowly decelerates the vehicle to the automatic travel target vehicle speed Vo, discomfort that is caused to the driver in sudden deceleration can be reduced. Furthermore, even when the automatic travel control is suddenly ended during the acceleration operation for any reason, the vehicle travel control device 1-1 can apply the drive force Fsu generated by the acceleration operation to the vehicle. Accordingly, further reduction of discomfort can be realized. When the driver operates the brake pedal to prioritize the deceleration operation during the automatic travel control, the driver can decelerate the vehicle as intended. Moreover, because the driver gradually and slowly accelerates the vehicle to the automatic travel target vehicle speed Vo when stopping the deceleration pedal using the brake pedal, the vehicle travel control device 1-1 can reduce the discomfort that is caused to the driver in sudden acceleration. Even when the automatic travel control is ended suddenly during the deceleration operation for some reason, the vehicle travel control device 1-1 can apply the braking force Bsd, which is generated by the deceleration operation, to the vehicle, and thus further reduction of discomfort can be realized.

Next, Embodiment 2 of the vehicle travel control device according to this invention is described with reference to FIGS. 10 and 11.

The vehicle travel control device 1-1 of Embodiment 2 is different from that of Embodiment 1 in the following points.

First, the braking device 200 of Embodiment 2 releases the communication state between the master cylinder, not shown, and the wheel cylinders of the respective wheels (so-called master cutting) when the braking force associated with the automatic travel control is generated by the automatic travel control target braking force Ba. Also, this brake device 200 is provided with neither a linear solenoid valve for adjusting the hydraulic pressure of each wheel cylinder, that is, braking force of each wheel, nor a hydraulic pressure sensor for detecting the hydraulic pressure of each wheel cylinder. Even when the driver makes the deceleration request by pedaling the brake pedal during the automatic travel control, the brake device 200 cannot control the braking force appropriately in response to the operation amount of the brake pedal.

Figure 10:
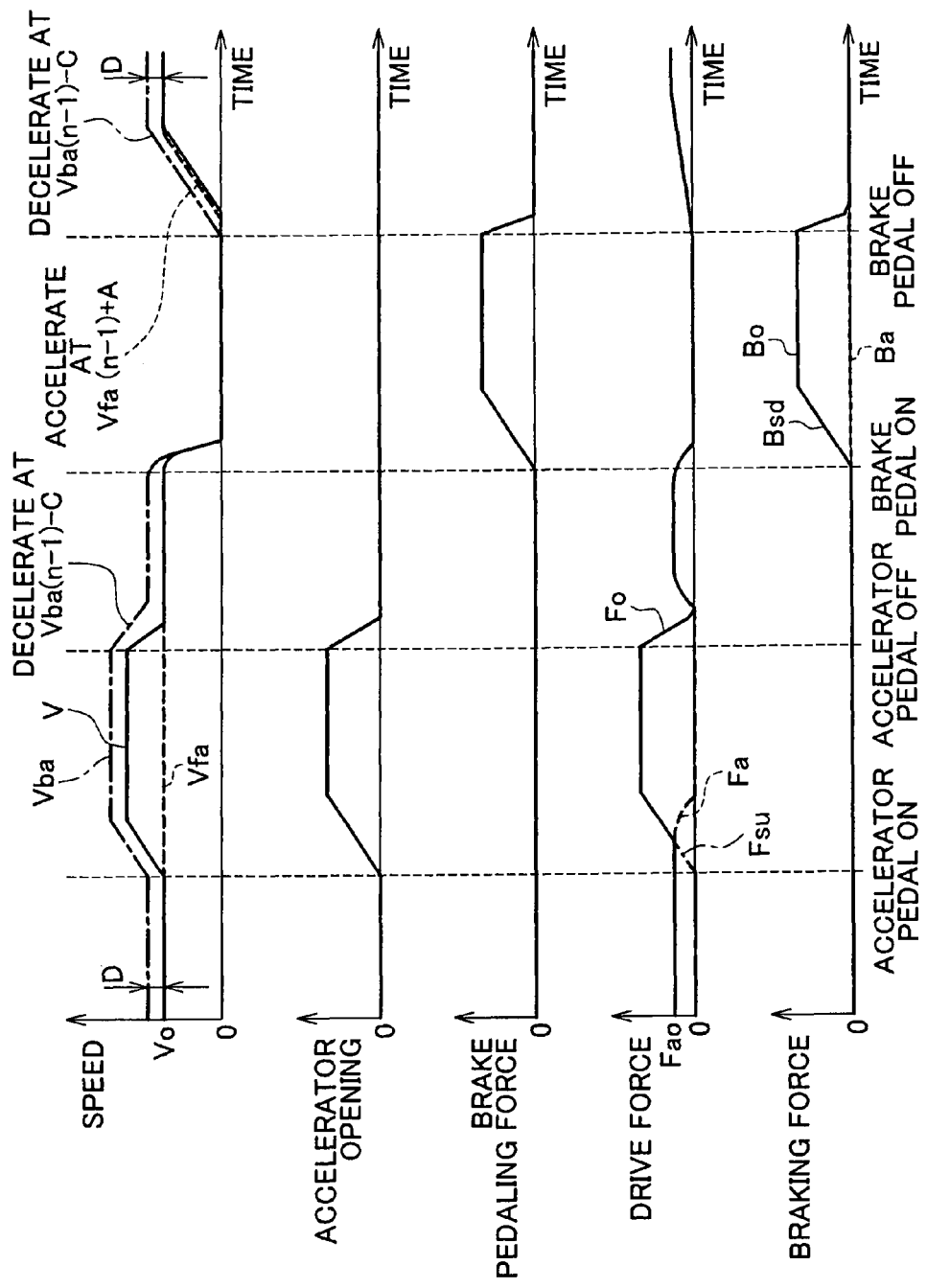
FIG. 10 is a time chart for explaining an operation performed by a vehicle travel control device of Embodiment 2 during travel on an ascending slope.

Therefore, in Embodiment 2, when the driver makes the deceleration request (turns the brake pedal ON) during the automatic travel control as shown in FIGS. 10 and 11, the automatic travel driving target vehicle speed Vfa is set at 0 and the automatic travel braking target vehicle speed Vba is gradually reduced at certain gradient. Specifically, the driver target vehicle speed calculation part 83 of Embodiment 2 is caused to obtain 0 as the automatic travel driving target vehicle speed Vfa in step ST103G shown in FIG. 7. Note that this gradient may be changed in accordance with the deceleration operation amount Ssd of the driver.

Moreover, in Embodiment 2, immediately after the driver stops the deceleration operation (takes his foot off the brake pedal), the automatic travel driving target vehicle speed Vfa and the automatic travel braking target vehicle speed Vba are gradually increased at certain gradient, as shown in FIGS. 10 and 11. For example, in this case the value "Vfa(n−1)+A," same as that of Embodiment 1, is obtained as the automatic travel driving target vehicle speed Vfa, and the value "Vba (n−1)+A," same as that of Embodiment 1, is obtained as the automatic travel braking target vehicle speed Vba. Note that this gradient may be changed in accordance with the deceleration operation amount Ssd of the driver.

FIG. 10 shows the situation where the vehicle automatically travels on an ascending slope at low speed. Specifically, in Embodiment 2, when the driver makes the deceleration request while automatically traveling on the ascending slope at low speed, the braking force associated with the automatic travel control does not have to be generated by the automatic travel control target braking force Ba. For this reason, the braking device 200 can maintain the communication state between the master cylinder and the wheel cylinders of the respective wheels. In this case, therefore, the braking force Bsd corresponding to the deceleration operation amount Ssd of the driver can be applied to the vehicle so that the driver can decelerate the vehicle as intended.

FIG. 11, on the other hand, shows the situation where the vehicle automatically travels on a descending slope at low speed. In Embodiment 2, when the driver makes the deceleration request while automatically traveling on the descending slope at low speed, the braking force including the deceleration operation amount of the driver can be applied to the vehicle by the automatic travel control target braking force Ba. In this case, although the brake device 200 releases the communication state between the master cylinder and the wheel cylinders of the respective wheels because the braking force associated with the automatic travel control is generated by the automatic travel control target braking force Ba, the driver can decelerate the vehicle as intended.

As described above, the vehicle travel control device 1-1 of Embodiment 2 can allow the driver to decelerate the vehicle as intended, even by using the brake device 200 described above.

As described above, the vehicle travel control device of the invention is useful in technologies that enable a driver to accelerate or decelerate his vehicle as intended when the driver performs the acceleration operation or deceleration operation during the automatic travel control.

The invention claimed is:

1. A vehicle travel control device, comprising:
a first controller that controls an engine driving force based on a driving target controlled variable;
a second controller that controls a braking force of a brake device based on a braking target controlled variable; and
a third controller that calculates the driving target controlled variable and/or braking target controlled variable for performing vehicle travel control so that a vehicle speed of a vehicle becomes a target vehicle speed, and outputs the driving target controlled variable to the first controller and the braking target controlled variable to the second controller,
wherein the third controller is configured to calculate driving target vehicle speed for the vehicle travel control by the engine driving force and to calculate braking target vehicle speed for the vehicle travel control by the braking force of the braking device, and
wherein upon detection of an acceleration operation performed by a driver during the vehicle travel control, the third controller sets the driving target controlled variable for the vehicle travel control in accordance with the engine driving force of the engine in response to the acceleration operation and the driving force that is calculated based on the driving target vehicle speed for the vehicle travel control, and sets the braking target vehicle speed for the vehicle travel control to a larger speed than the current vehicle speed.

2. A vehicle travel control device, comprising:
a first controller that controls an engine driving force based on a driving target controlled variable;
a second controller that controls a braking force of a brake device based on a braking target controlled variable; and
a third controller that calculates the driving target controlled variable and/or braking target controlled variable for performing vehicle travel control so that a vehicle speed of a vehicle becomes a target vehicle speed, and outputs the driving target controlled variable to the first controller and the braking target controlled variable to the second controller,
wherein the third controller is configured to calculate driving target vehicle speed for the vehicle travel control by the engine driving force and to calculate braking target vehicle speed for the vehicle travel control by the braking force of the braking device, and wherein upon detection of a deceleration operation performed by a driver during the vehicle travel control, the third controller sets the driving target controlled variable for the vehicle travel control in accordance with the braking force of the braking device in response to the deceleration operation and the braking force that is calculated based on the braking target vehicle speed for the vehicle travel control, and sets the braking target vehicle speed for the vehicle travel control to a same speed as the current vehicle speed by decreasing the driving target controlled variable to zero.

3. The vehicle travel control device according to claim 1, wherein the first controller, the second controller, and the third controller are integrated into a single control device.

4. The vehicle travel control device according to claim 1, wherein when the third controller does not detect the deceleration operation performed by the driver during the vehicle travel control, and when at the time of the detection by the third controller is immediately after the driver has stopped the deceleration operation, the third controller calculates a target vehicle speed for vehicle travel control by the engine, so that the vehicle is gradually accelerated.

5. The vehicle travel control device according to claim 1, further comprising gradient detection portion for detecting a gradient of a road on which the vehicle travels, wherein when the third controller does not detect the deceleration operation performed by the driver during the vehicle travel control, and when the gradient of the road indicates an ascending slope, the third controller calculates a target vehicle speed for vehicle travel control by the engine, so that the target vehicle speed is matched with a target vehicle speed that is set by a target vehicle speed setting part.

6. The vehicle travel control device according to claim 5, wherein when the third controller does not detect the deceleration operation performed by the driver during the vehicle travel control, and when the gradient of the road indicates a descending slope, the third controller calculates the target vehicle speed for vehicle travel control by the engine, so that the target vehicle speed becomes lower than the target vehicle speed that is set by the target vehicle speed setting part.

7. The vehicle travel control device according to claim 1, further comprising gradient detection portion for detecting a gradient of a road on which the vehicle travels, wherein when the third controller detects the deceleration operation performed by the driver during the vehicle travel control, and when the gradient of the road indicates an ascending slope, the third controller calculates a target vehicle speed for vehicle travel control by the engine, so that this target vehicle speed becomes lower than the target vehicle speed that is set by a target vehicle speed setting part.

8. The vehicle travel control device according to claim 7, wherein when the third controller detects the deceleration operation performed by the driver during the vehicle travel control, and when the gradient of the road indicates a descending slope, the third controller calculates the target vehicle speed for vehicle travel control by the engine, so that the target vehicle speed is gradually reduced to 0.

9. The vehicle travel control device according to claim 1, wherein when the third controller detects neither the deceleration operation nor the acceleration operation performed by the driver during the vehicle travel control, and when at the time of the detection by the third controller is immediately after the driver has stopped the acceleration operation, the third controller calculates the target vehicle speed for vehicle travel control by the brake device, so that the vehicle is gradually decelerated.

10. The vehicle travel control device according to claim 1, wherein when the third controller detects neither the deceleration operation nor the acceleration operation performed by the driver during the vehicle travel control, and when at the time of the detection by the third controller is immediately after the driver has stopped the deceleration operation, the third controller calculates the target vehicle speed for vehicle travel control by the brake device, so that the vehicle is gradually accelerated.

11. The vehicle travel control device according to claim 1, further comprising gradient detection portion for detecting a gradient of a road on which the vehicle travels, wherein when the third controller detects neither the deceleration operation nor acceleration operation performed by the driver during the vehicle travel control, and when the gradient of the road indicates an ascending slope, the third controller calculates the target vehicle speed for vehicle travel control by the brake device, so that this target vehicle speed becomes higher than the target vehicle speed that is set by a target vehicle speed setting part.

12. The vehicle travel control device according to claim 11, wherein when the third controller detects neither the deceleration operation nor the acceleration operation performed by the driver during the vehicle travel control, and when the gradient of the road indicates a descending slope, the third controller calculates the target vehicle speed for vehicle travel control by the brake device, so that this target vehicle speed is matched with the target vehicle speed that is set by the target vehicle speed setting part.

13. A vehicle travel control method, comprising the steps of:
    determining whether or not vehicle travel control is performed to control a vehicle speed of a vehicle to a target vehicle speed;
    calculating driving target vehicle speed for the vehicle travel control by an engine driving force and calculating braking target vehicle speed for the vehicle travel control by the braking force of a braking device;
    when the vehicle travel control is performed and when an acceleration operation performed by a driver is detected, setting the driving target controlled variable for the vehicle travel control in accordance with the engine driving force of an engine in response to the acceleration operation and the driving force that is calculated based on the driving target vehicle speed for the vehicle travel control; and
    setting the braking target vehicle speed for the vehicle travel control to a larger speed than the current vehicle speed.

14. A vehicle travel control method, comprising the steps of:
    determining whether or not vehicle travel control is performed to control a vehicle speed of a vehicle to a target vehicle speed;
    calculating driving target vehicle speed for the vehicle travel control by an engine driving force and calculating braking target vehicle speed for the vehicle travel control by the braking force of a braking device;
    when the vehicle travel control is performed and when a deceleration operation performed by a driver is detected, setting the driving target controlled variable for the vehicle travel control in accordance with the braking force of the braking device in response to the deceleration operation and the braking force that is calculated based on the braking target vehicle speed for the vehicle travel control; and setting the braking target vehicle speed for the vehicle travel control to a same speed as the current vehicle speed by decreasing the driving target controlled variable to zero.

15. The vehicle travel control device according to claim 2, wherein the first controller, the second controller, and the third controller are integrated into a single control device.

16. The vehicle travel control device according to claim 2, wherein when the third controller does not detect the deceleration operation performed by the driver during the vehicle travel control, and when at the time of the detection by the third controller is immediately after the driver has stopped the deceleration operation, the third controller calculates a target vehicle speed for vehicle travel control by the engine, so that the vehicle is gradually accelerated.

17. The vehicle travel control device according to claim 2, further comprising gradient detection portion for detecting a gradient of a road on which the vehicle travels, wherein when the third controller does not detect the deceleration operation performed by the driver during the vehicle travel control, and when the gradient of the road indicates an ascending slope, the third controller calculates a target vehicle speed for vehicle travel control by the engine, so that the target vehicle speed is matched with a target vehicle speed that is set by a target vehicle speed setting part.

18. The vehicle travel control device according to claim 17, wherein when the third controller does not detect the deceleration operation performed by the driver during the vehicle travel control, and when the gradient of the road indicates a descending slope, the third controller calculates the target vehicle speed for vehicle travel control by the engine, so that the target vehicle speed becomes lower than the target vehicle speed that is set by the target vehicle speed setting part.

19. The vehicle travel control device according to claim 2, further comprising gradient detection portion for detecting a gradient of a road on which the vehicle travels, wherein when the third controller detects the deceleration operation performed by the driver during the vehicle travel control, and when the gradient of the road indicates an ascending slope, the third controller calculates a target vehicle speed for vehicle travel control by the engine, so that this target vehicle speed becomes lower than the target vehicle speed that is set by a target vehicle speed setting part.

20. The vehicle travel control device according to claim 19, wherein when the third controller detects the deceleration operation performed by the driver during the vehicle travel control, and when the gradient of the road indicates a descending slope, the third controller calculates the target vehicle speed for vehicle travel control by the engine, so that the target vehicle speed is gradually reduced to 0.

21. The vehicle travel control device according to claim 2, wherein when the third controller detects neither the deceleration operation nor the acceleration operation performed by the driver during the vehicle travel control, and when at the time of the detection by the third controller is immediately after the driver has stopped the acceleration operation, the third controller calculates the target vehicle speed for vehicle travel control by the brake device, so that the vehicle is gradually decelerated.

22. The vehicle travel control device according to claim 2, wherein when the third controller detects neither the deceleration operation nor the acceleration operation performed by the driver during the vehicle travel control, and when at the time of the detection by the third controller is immediately after the driver has stopped the deceleration operation, the third controller calculates the target vehicle speed for vehicle travel control by the brake device, so that the vehicle is gradually accelerated.

23. The vehicle travel control device according to claim 2, further comprising gradient detection portion for detecting a gradient of a road on which the vehicle travels, wherein when the third controller detects neither the deceleration operation nor acceleration operation performed by the driver during the vehicle travel control, and when the gradient of the road indicates an ascending slope, the third controller calculates the target vehicle speed for vehicle travel control by the brake device, so that this target vehicle speed becomes higher than the target vehicle speed that is set by a target vehicle speed setting part.

24. The vehicle travel control device according to claim 23, wherein when the third controller detects neither the deceleration operation nor the acceleration operation performed by the driver during the vehicle travel control, and when the gradient of the road indicates a descending slope, the third controller calculates the target vehicle speed for vehicle travel control by the brake device, so that this target vehicle speed is matched with the target vehicle speed that is set by the target vehicle speed setting part.

* * * * *